United States Patent
Wong

(10) Patent No.: US 11,273,375 B1
(45) Date of Patent: Mar. 15, 2022

(54) METHODS AND SYSTEMS FOR RENDERING VIRTUAL THREE-DIMENSIONAL FIELD OF PLAY FOR AR-ENHANCED GAMEPLAY EXPERIENCE

(71) Applicant: Justin Hanyan Wong, Atherton, CA (US)

(72) Inventor: Justin Hanyan Wong, Atherton, CA (US)

( * ) Notice: Subject to any disclaimer, the term of this patent is extended or adjusted under 35 U.S.C. 154(b) by 0 days.

(21) Appl. No.: 17/006,769

(22) Filed: Aug. 28, 2020

(51) Int. Cl.
*A63F 13/53* (2014.01)
*A63F 13/655* (2014.01)
*A63F 13/213* (2014.01)

(52) U.S. Cl.
CPC ............ *A63F 13/53* (2014.09); *A63F 13/213* (2014.09); *A63F 13/655* (2014.09); *A63F 2300/8082* (2013.01)

(58) Field of Classification Search
CPC .......................... A63F 13/53; A63F 2300/8082
See application file for complete search history.

(56) References Cited

U.S. PATENT DOCUMENTS

| | | | |
|---|---|---|---|
| 8,823,697 B2 | 9/2014 | Woo et al. | |
| 9,779,479 B1 * | 10/2017 | Makinen | G06T 15/506 |
| 10,155,152 B2 | 12/2018 | Maharbiz et al. | |
| 10,155,156 B2 | 12/2018 | Jaqua et al. | |
| 10,741,006 B2 | 8/2020 | Russ et al. | |
| 2002/0084974 A1 * | 7/2002 | Ohshima | G06T 19/006 345/156 |
| 2017/0161909 A1 * | 6/2017 | Hamanaka | A63F 13/57 |
| 2020/0078680 A1 | 3/2020 | Simpkinson et al. | |
| 2020/0249819 A1 * | 8/2020 | Berquam | G06F 3/011 |
| 2020/0368616 A1 * | 11/2020 | Delamont | A63F 13/25 |

* cited by examiner

*Primary Examiner* — James S. McClellan
(74) *Attorney, Agent, or Firm* — Kanika Radhakrishnan; Evergreen Valley Law Group

(57) ABSTRACT

Embodiments provide computer-implemented methods and systems for rendering virtual three-dimensional fields of play onto an augmented reality enabled gaming device. Methods include receiving, by a processing system, a three-dimensional perimeter along a physical gameplay surface from an augmented reality enabled gaming device, determining a Euclidean space based on the three-dimensional perimeter, calculating a total volume of the Euclidean space based on the origin and the outer extension of the field of play along the three dimensions defined by the player, generating a virtual three-dimensional grid by dividing the total volume of the Euclidean space into a number of cuboids, facilitating, by the processing system, rendering of the virtual three-dimensional grid, receiving a selection of a plurality of virtual three dimensional objects from the augmented reality enabled gaming device, and fusing the plurality of virtual three-dimensional objects using a predefined set of rules to obtain a holistic field of play.

20 Claims, 14 Drawing Sheets

| OBJECT IDENTIFIER 602 | IMAGE 604 | TYPE 606 | RENDERING RULES 608 | TAGS 610 | ATTRIBUTE 612 | OTHER INFORMATION 614 |
|---|---|---|---|---|---|---|
| 2141 | | STRUCTURE | TOP: 271<br>FRONT: 365 \| BACK: 465<br>LEFT: 350 \| RIGHT: 620<br>BOTTOM: 340 | CASTLE, STONE WALL, BATTLEMENT, PARAPET, DEFENSE | PRIVATE; OWNER: MT. VIEW CLUB | ......... |
| 2142 | | STRUCTURE | TOP: 368<br>FRONT: 365 \| BACK: 465<br>LEFT: 271 \| RIGHT: 938<br>BOTTOM: 340 | CASTLE, TOWER, RAMPART, PARAPET, DEFENSE | COMMUNITY | ......... |
| 2143 | | TERRAIN | TOP: 745<br>FRONT: 365 \| BACK: 465<br>LEFT: 985 \| RIGHT: 223<br>BOTTOM: 379 | STREAM, WATER, CHANNEL | COMMUNITY | ......... |
| 2144 | | GEOGRAPHIC FEATURE | TOP: 795<br>FRONT: 365 \| BACK: 465<br>LEFT: 249 \| RIGHT: 875<br>BOTTOM: 330 | FOREST, TREES, GROVE, WOODLAND | COMMUNITY | ......... |
| ......... | | ......... | ......... | ......... | ......... | ......... |
| ......... | | ......... | ......... | ......... | ......... | ......... |
| 0718 | | CHARACTER | N/A | WARRIOR, BOY, MAN, WANDERER | PRIVATE; OWNER: JACK | ......... |
| 0814 | | CHARACTER | N/A | GARGOYLE, WINGED, MONSTER | COMMUNITY | ......... |

| FIELD OF PLAY ID 702 | GAME IDENTIFIER 704 | RECORD 706 | TIME STAMP 708 | PLAYER ID AND CHARACTER 710 | GAME STATE 712 | LOG 714 | NOTES 716 | OTHER INFORMATION 718 |
|---|---|---|---|---|---|---|---|---|
| TPRG-CASTLE ACDX | Ax89 | YES | YYYY-MM-DD HH:MM:SS | PLAYERX + CHAR. 0718 | SUSPENDED | LAST ACTION | ...... | ...... |
| TPRG-CASTLE ACDX | Ax89 | YES | YYYY-MM-DD HH:MM:SS | PLAYERY13 + CHAR. 0814 | SUSPENDED | LAST ACTION | ...... | ...... |
| TPRG-CASTLE ACDX | Ax89 | YES | YYYY-MM-DD HH:MM:SS | PLAYERZ + CHAR. 0456 | SUSPENDED | LAST ACTION | ...... | ...... |
| TPRG-CASTLE ACDX | CD28 | NO | N/A | PLAYERA + CHAR. 0974 | ONGOING | LAST ACTION | ...... | ...... |
| TPRG-CASTLE ACDX | Cd28 | NO | N/A | PLAYERB + CHAR. 0379 | ONGOING | LAST ACTION | ...... | ...... |
| TMG-FIELD ERTA | Bd47 | YES | YYYY-MM-DD HH:MM:SS | LIST OF PLAYERS | COMPLETED | GAME RESULT | ...... | ...... |
| TMG-MARSH ERTX | Tr35 | NO | N/A | PLAYER1 + CHAR. N/A | ONGOING | LAST ACTION | N/A | ...... |
| TMG-MARSH ERTX | Tr35 | NO | N/A | PLAYER2 + CHAR. N/A | ONGOING | LAST ACTION | N/A | ...... |
| TPRG-MANOR RTSX | UNPLAYED | NO | N/A | N/A | N/A | N/A | N/A | ...... |

METHODS AND SYSTEMS FOR RENDERING VIRTUAL THREE-DIMENSIONAL FIELD OF PLAY FOR AR-ENHANCED GAMEPLAY EXPERIENCE

TECHNICAL FIELD

Embodiments of the disclosure relate generally to physical tabletop role-playing and miniature games. Embodiments relate more particularly to a computer-implemented method and system to render a virtual three-dimensional field of play, and to provide augmented reality (AR) enhanced and remote gameplay experience for physical role-playing and miniature tabletop games.

BACKGROUND

Tabletop games are games that are played on a table or other flat surface in accordance with certain pre-defined rules of play. A tabletop role-playing game ("TRPG") will usually have two or more players sitting around a table to tell a narrative story while role-playing their custom characters and rolling dice to see if the actions of their characters are successful or not in accordance with the rules of such TRPG being played. TRPGs also commonly use "pen and paper" to track the status of their custom characters and their abilities. Another type of tabletop games is the tabletop miniature game ("TMG"). TMGs allow the players to build and advance miniatures such as tanks, ships, etc. through an imaginative terrain or a purposely constructed terrain placed on the tabletop to do battle with one or more players in accordance with the rules of the TMG being played.

The "field of play" is an imaginative location or terrain on a tabletop where the gaming adventure or campaign takes place. In case of TRPGs or TMGs, the field of play is, for example, a place like a castle which the players explore, or a terrain where the battle takes place. The field of play exists only in the imaginative mind of the players, in the form of hand-drawn maps or diagrams of the place or terrain, and/or non-portable physical set pieces of the place or terrain. Building such field of play would take a very long time, and much effort and expense to build. One of the challenges to gameplay experience with this traditional approach is that it hinders the flexibility of the games to be played among multiple, geographically dispersed players and displayed to spectators as, for example, in a live stream setting.

Beyond the difficulty in live streaming games, additional challenges to gameplay experience with this traditional approach are that it: (i) distracts from the gameplay experience by not offering the players and spectators, beyond the empty tabletop or poorly drawn map or diagrams of the field of play, any sense of "realism" of the place being explored or the battle fought, and (ii) increases the cost in terms of time and effort, and nuisance of purchasing, building and handling physical set pieces if such field of play were to include purposely built set pieces placed upon the tabletop. If physical set pieces were employed to enhance the realism of the gameplay experience, it will be more difficult to (i) transport the set pieces to different gaming venue, and (ii) replicate if the game were to be played at multiple venues simultaneously like in a live stream setting. Moreover, for TRPGs, sometimes, there is a need for multi-story or tall miniature structure and the current state of gameplay requires either the players imagining the tall structure being in the field of play, or shabbily constructed miniature structure that could break during gameplay or transport.

Existing methods include physical tabletop and manual building of the game setup. These are confined to be played at a single place on the same tabletop as the field of play will be created on a common tabletop with all the players sitting around the table. Currently, there are no methods to play the tabletop games with 3D models in a local, distributed, or live stream setup that can be viewed through one or more gaming devices.

In light of the above discussion, there exists a need for technological solutions that enhance the level of realism to local, distributed, or live streamed TRPGs and TMGs played under existing gameplay rules to enhance players' and spectators' experience or enjoyment

SUMMARY

Various embodiments of the present disclosure provide systems and computer-implemented methods for rendering a virtual three-dimensional field of play on a physical tabletop for AR-enhanced gameplay experience. The computer-implemented method includes receiving, by a processing system, a three-dimensional perimeter along a physical gameplay surface, from an augmented reality enabled gaming device. The three-dimensional perimeter may include an origin and an outer extension of a field of play along three dimensions defined by a player. The computer-implemented method includes determining, by the processing system, a Euclidean space, based at least, on the three-dimensional perimeter. The computer-implemented method further includes, calculating, by the processing system, a total volume of the Euclidean space, based at least, on the origin and the outer extension of the field of play along the three dimensions defined by the player. The computer-implemented method includes, generating, by the processing system, a virtual three-dimensional grid, by dividing the total volume of the Euclidean space into a number of cuboids. Further, the computer-implemented method includes facilitating, by the processing system, rendering of the virtual three-dimensional grid. The virtual three-dimensional grid may be configured to be displayed on the physical gameplay surface as viewed through the augmented reality enabled gaming device. The computer-implemented method includes, receiving, by the processing system, a selection of a plurality of virtual three dimensional objects, from the augmented reality enabled gaming device. The computer-implemented method further includes, fusing, by the processing system, the plurality of virtual three-dimensional objects using a pre-defined set of rules to obtain a holistic field of play.

In another embodiment, a processing system is disclosed. The system includes a memory including executable instructions and a processor communicably coupled to a communication interface, the processor is configured to execute the executable instructions to cause the processing system to at least receive a three-dimensional perimeter along a physical gameplay surface, from an augmented reality enabled gaming device. The three-dimensional perimeter may include an origin and an outer extension of a field of play along three dimensions defined by a player. The processing system is caused to determine a Euclidean space, based at least, on the three-dimensional perimeter. The processing system is further caused to calculate a total volume of the Euclidean space, based at least, on the origin and the outer extension of the field of play along the three dimensions defined by the player. The processing system is caused to divide the total volume of the Euclidean space into a number of cuboids. The processing system is further caused to generate a virtual three-dimensional grid, based at least, on the number of cuboids. The processing system is caused to facilitate, rendering of the virtual three-dimensional grid. The virtual three-dimensional grid may be configured to be displayed on the physical gameplay surface as viewed through the augmented reality enabled gaming device. The processing system is further caused to receive a selection of a plurality of virtual three dimensional objects, from the augmented reality enabled gaming device. The processing system is caused to fuse the plurality of virtual three-dimensional objects using a pre-defined set of rules to obtain a holistic field of play.

In yet another embodiment, an augmented reality enabled gaming device is disclosed. The augmented reality enabled gaming device may include a plurality of sensors, a memory including executable instructions and a processor communicably coupled to a communication interface, the processor configured to execute the executable instructions to cause the augmented reality enabled gaming device to at least download the client-side application, via the server system. The augmented reality enabled gaming device is caused to provide a user interface to the player to select the origin and the outer extension of the field of play along the three dimensions. The augmented reality enabled gaming device is further caused to display the plurality of virtual three-dimensional objects stored in the object library, to the player via another user interface. The augmented reality enabled gaming device is caused to provide a user interface to the player to drag and drop a plurality of virtual three-dimensional objects to be populated in the virtual three-dimensional grid, via another user interface.

BRIEF DESCRIPTION OF THE FIGURES

For a more complete understanding of example embodiments of the present invention, reference is now made to the following descriptions taken in connection with the accompanying drawings in which:

FIG. 6 is a table stored in the OL including a plurality of attributes associated with the virtual three-dimensional objects, in accordance with an example embodiment;

FIG. 7 is a table stored in a game repository including structural data associated with episodes of games, in accordance with an example embodiment;

DETAILED DESCRIPTION OF THE EMBODIMENTS

Figure 1:
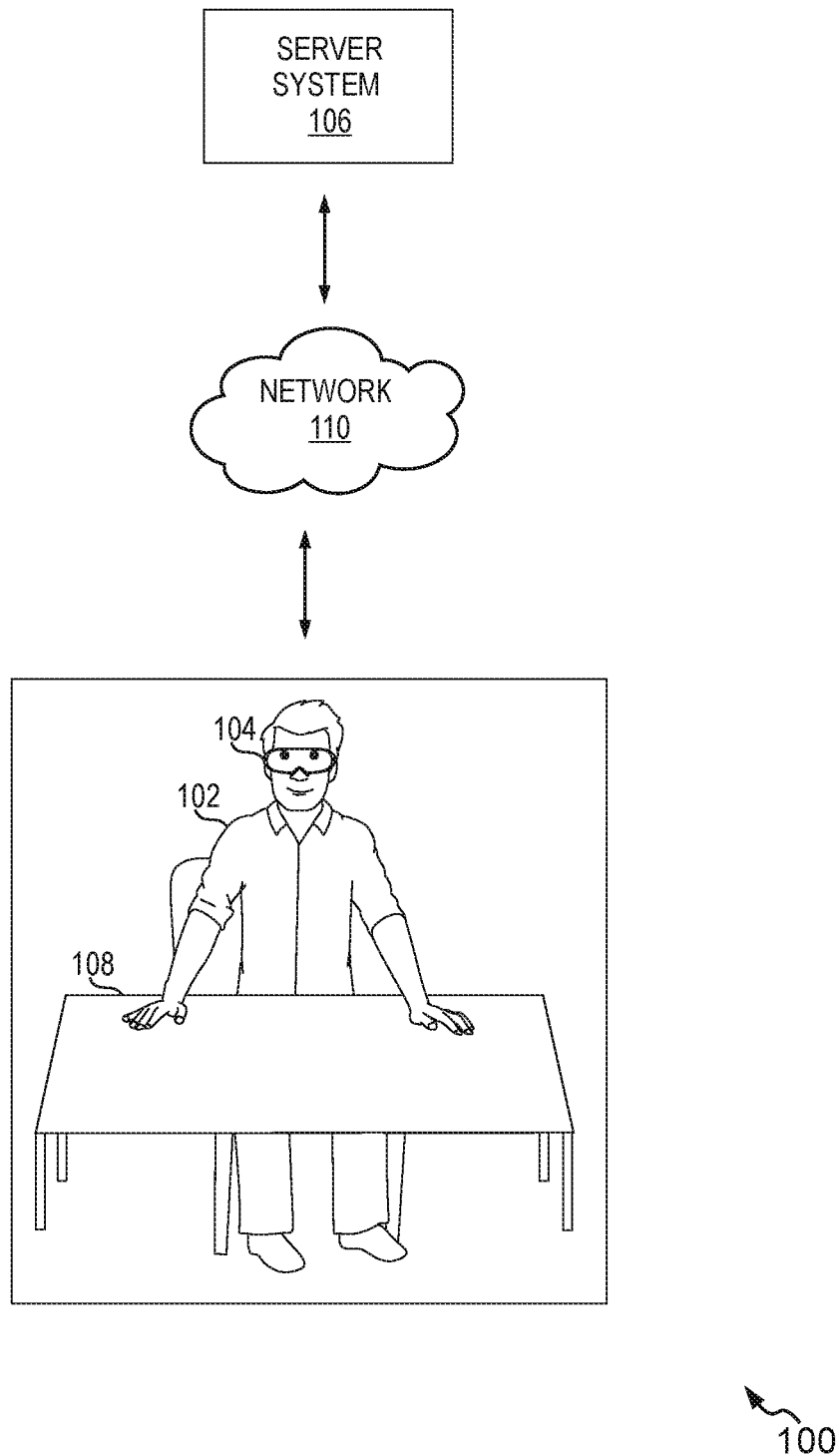
FIG. 1 illustrates an example representation of an environment, related to at least some example embodiments of the present disclosure.

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The term "field of play" used throughout the description refers to a graphical space that a player will view through the augmented reality enabled gaming devices such as an AR headset or a goggle. The player may be inside the field of play and may move around and perform operations allowed by the respective game.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The above-mentioned needs are met by a computer-implemented method and system to allow players to experience augmented reality while playing traditional TRPG and TMG. The following detailed description is intended to provide example implementations to one of ordinary skill in the art and is not intended to limit the invention to the explicit disclosure, as one of ordinary skill in the art will understand that variations can be substituted that are within the scope of the invention as described.

Overview

Various example embodiments of the present disclosure provide method and system for generating and rendering, by a server system, a virtual three-dimensional field of play including fused virtual three-dimensional objects for tabletop role-playing games, including but not limited to, Dungeons & Dragons™, Starfinder™, etc., and tabletop miniature games, including but not limited to Warhammer™, Warmachine™, etc. The virtual three-dimensional objects may include, but not limited to, buildings and building components, structures like fence, trenches, earthworks, etc., infrastructural components like roads, bridges, etc., vegetation like trees, and natural and geographical features like hills, rivers, etc. These objects are assembled and displayed on a field of play (together, the "three-dimensional objects"). All objects included in the set of three-dimensional objects and avatar of characters are virtual three-dimensional objects (that is, not real-life) generated using computer graphics techniques. When viewed by local or remote players through an augmented reality enabled gaming device, the field of play of the tabletop game, populated with the virtual three-dimensional objects, is virtually displayed on the gaming device as if the field of play is projected onto a physical tabletop.

The gaming device is an augmented or mixed reality viewing device equipped with a plurality of sensors such as hand movement tracker, head movement tracker, etc. The viewing device may be one of, but not limited to, a mobile device like a cell phone, a smart television, a personal computer, a tablet computer, a large screen video display, a consumer wearable like smart glasses, or a special purpose AR headset or a goggle. Where appropriate, and in accordance with gaming rules, an avatar of characters selected by players to be used in tabletop games are superimposed onto the field of play as viewed through the gaming device. The tabletop game will be played in this virtual field of play following the same gaming rules as if playing a legacy tabletop game.

In an embodiment, the present disclosure provides a method for enabling the players, wearing or viewing through an augmented reality enabled gaming device, to mark the three-dimensional perimeter (length, width, and height along the x, y, and z-axis) of the physical tabletop that forms the field of play. A Euclidean space is determined based on the perimeter marked by the player. The Euclidean space is divided equally into a pre-defined number of three-dimensional rectangular cells ("Cuboid") of equal volume to form a virtual three-dimensional grid (the "3D Grid") as viewed through the augmented reality enabled gaming device. The server system is configured to calculate the total volume of the Euclidean space and divide the total volume into a pre-defined number of cuboids. Therefore, the server system generates a stack of cuboids placed in the virtual field of play as viewed through the augmented reality enabled gaming device. In an embodiment, the virtual three-dimensional grid is divided such that the number of cuboids will have equal volumes.

In another example embodiment, the method also provides for the creation and use of an object library (the "OL") that stores a collection of aforementioned virtual three-dimensional objects and characters. The OL is stored in a database in the server system which could be an on-premise server or a remote server located in the cloud storage. The virtual three-dimensional objects from the OL could be selected, modified and placed within each cuboid of the virtual three-dimensional grid. Each cuboid may contain zero or one virtual three-dimensional object, to compose the place and/or terrain forming the virtual field of play that can be used to play an episode of tabletop game. Using the movement of the players' hands as detected by the augmented reality enabled gaming device's hand movement tracker, the virtual three-dimensional grid including the virtual field of play, could be rotated along each of the three dimensions. In another embodiment, blocks of cuboids may be split apart so individual virtual three-dimensional objects can be dragged from a list shown in a user interface display ("UI") of the augmented reality enabled gaming device onto any cuboids in the virtual three-dimensional grid as desired.

After the completion of populating the desired cuboids with desired virtual three-dimensional objects, the server system is configured to graphically fuse the virtual three-dimensional objects using a pre-defined set of rules. After fusing the desired virtual three-dimensional objects selected by the player, the server system stores the corresponding field of play in a database against a unique identifier. The player may search and retrieve the field of play from the server system using the unique identifier. The placement of all the virtual three-dimensional objects in each cuboid is recorded in a field of play database (the "FPDB") and stored in the server system.

A holistic field of play is obtained by graphically fusing the desired virtual three-dimensional objects. The holistic field of play is then rendered graphically by the server system and available to be displayed on the physical gameplay surface, as viewed through an augmented reality enabled gaming device. The holistic field of play is fused such that the individual virtual three-dimensional objects placed in selected cuboids are scaled and linked to the virtual three-dimensional objects placed in adjacent cuboids. The fusing process is performed to visually form a unified structure or terrain, as viewed through the augmented reality enabled gaming device. The resultant rendered holistic field of play is assigned a unique identifier and stored as a file in the game repository (the "GR") in a server system. The server system could be an on-premise server or a server located in the cloud. A three-dimensional or holographic image of the composed field of play and/or the selected characters can be viewed through the augmented reality enabled gaming device by one or more local and/or remote players for an episode of the tabletop gameplay.

In another embodiment consisting of all players congregating in one geographical location, an episode of the tabletop gameplay is initiated by having players logging into the server system with access to a GR. The players will select the desired field of play to be used in the present episode using a unique identifier. The file including the field of play is sent via the internet or data network to a centralized computer (e.g., the server system) or each player's gaming device. The centralized computer will determine the portion of the pre-rendered field of play and/or other computer-generated elements including UI that should logically be displayed to the player, by the gaming device. The appropriate image is then displayed in each player's gaming device virtually superimposed onto the physical tabletop. If appropriate, as dictated by the rules of the game, a character is selected by each player for the episode of the tabletop game and displayed by the gaming device in accordance with the above described method. The episode can then proceed in accordance with the rules of the game with communication among the players on the proceeding of the game. The proceeding of an episode is saved in the GR so that, in case of an incomplete episode, the game can be finished at a later time in accordance with the rules of the game.

Depending on the requirement of the tabletop game being played, the method enables the display of real-world elements (e.g., the physical table, dice roll or miniature figures) and computer-generated virtual elements (e.g., the field of play or selected characters) in a variety of display modes as viewed through the gaming device. For TMG, the player will see the physical miniature figures on the physical tabletop within the field of view superimposed on the portion of the field of play. For TRPG, the player can use the UI to choose between two viewing modes: (a) the view of the field of play from their character's perspective, or (b) a macro or a birds-eye view of the field of play around their character with certain limitations.

In another alternate embodiment, a plurality of players playing the same episode of the game may be dispersed geographically. The file consisting of the desired field of play is sent via the internet or data network to a centralized computer (e.g., the server system) or each of the plurality of player's gaming device at the dispersed location. The centralized computer will determine the portion of the field of play that should be rendered and/or other computer-generated elements including UI that should logically be displayed by each of the gaming devices. Communication among the plurality of players on the proceeding of the game is achieved via voice through the server system or via a separate voice-over-IP network. As in the previous embodiment, the proceeding of an episode is saved in the GR so that, in case of an incomplete episode, the game can be finished at a later time in accordance with the rules of the game.

Each of the geographically dispersed plurality of players will be able to observe the proceeding of the game as if they are congregated around the same physical table. For TMG, each remote player will be able to see all the physical miniature figures placed on the remote physical table through the camera attached to the gaming device of a player physically present at the physical tabletop. The character-view or macro-view display options available to players congregating in one location to play TRPG are also available to the plurality of players under this alternate multi-location embodiment.

In yet another alternate embodiment, the virtual three-dimensional objects stored in the OL and the field of play stored in the GR are licensed to the players. The licensing may be based on the terms of a certain licensing agreement, by a third-party developer or game publisher (the "Licensor") for use by the licensee players. Based on the terms of the licensing agreement, the licensed virtual three-dimensional objects and/or places and terrains are licensed to the licensee for certain defined limited use or unlimited use. Furthermore, the licensing terms may or may not allow the licensee to alter, author, and/or add to the virtual three-dimensional objects and/or places and terrains as provided by the third-party developer or game publisher. Such licensing terms should also define the ownership of the altered, authored, or additional virtual three-dimensional objects and/or places and terrains deposited into the OL and GR. The ownership of the recorded proceeding of gameplay episodes stored in OL and GR may also be defined in the licensing terms.

In this embodiment, the digital assets in an OL or complete field of play in a GR could also be created by any licensee players. The licensee players may create the digital assets, using approaches described herein or other approaches, to be licensed to other players in the community based on licensor's licensing terms.

In an additional alternate embodiment, software tools can be supplied by a third-party developer to enable the authoring and altering of virtual three-dimensional objects, characters and complete field of play. The virtual three-dimensional objects, characters and complete field of play may be authored or altered from sketch, alteration of existing three-dimensional objects, characters and complete field of play, and importation of external art.

In still another alternate embodiment, an episode of the tabletop game played on a field of play is broadcasted live or replayed to a live stream channel for viewing by on-site or remote spectators with gaming devices. The episode of the tabletop game played on a field of play may also be re-rendered for viewing in 2D on video screens or online video sharing and streaming platforms. For this embodiment, viewers can view a TMG through the perspective of a streaming player physically present at the physical tabletop. For TRPG, the audience can view the game from (i) the perspective of each viewer's chosen player in one of character or macro viewing mode as described above, (ii) the perspective of a chosen character among all characters, or (iii) the macro view of one chosen character.

In another example embodiment, tabletop gaming-related entertainment, tutorial and/or digital advertising content may be displayed to the players. The digital advertisement content may be displayed based on the identity, preference, demographics, or other characteristics of the players, on the gaming device before or after an episode of a game. In an alternate embodiment, the digital advertising content may be displayed at a time of players' choosing. For example, an introductory video of a new line of miniature figures or a new collection of TRPG characters can be shown only to players of TMG or TRPG respectively after they log in to the game via server system. Advertising revenue generated from displaying commercial content could also be used to offset the cost players incur subscribing to virtual three-dimensional objects, characters, a field of play, and/or other costs.

In an embodiment, a server system is configured to push digital content from the server system or another advertisement or content distribution server to the augmented reality enabled gaming device. The digital content may include, tabletop gaming-related entertainment, tutorial and/or advertising content. The server system may facilitate analyzing player related data stored in the repositories. Analyzing player related data may include performing a simple analysis on what games the player plays, what character the player chooses and the like. The server system may further determine the digital content to be displayed on the augmented reality enabled gaming device based on the analysis. The digital content may be sent based on a player's gaming interest and preference as determined based on an analysis of the player related data stored in the repositories of the server system. The repositories may include account & bookkeeping information repository and GR. In an embodiment, the digital content can be sent before or after an episode of a game or at an alternate time of the player's choosing. In an example, the digital content, in this case, an advertisement for miniature figures is displayed after the client-side application is downloaded and run on the augmented reality enabled gaming device, but before the commencement of the game. For this example, as the player logs in to the server system, the server system can determine what kind of digital content should be displayed and when, in order to enhance the gaming experience and/or optimize business objectives.

Various example embodiments of the present disclosure are described hereinafter with reference to FIGS. 1 to 13.

FIG. 1 illustrates an example representation of an environment 100 related to at least some example embodiments of the present disclosure. The environment 100 is depicted to include an augmented reality enabled gaming device 104 associated with a player 102. The environment 100 further includes a server system 106 which may be a server system associated with the game being played on the augmented reality enabled gaming device 104, by the player 102. The environment 100 also includes a tabletop 108 which is shown in front of the player 102. The augmented reality enabled gaming device 104 and the server system 106 may communicably be coupled via a network 110.

The network 110 may include, without limitation, a local area network (LAN), a wide area network (WAN) (e.g., the Internet, etc.), a mobile network, a virtual network, and/or another suitable public and/or private network capable of supporting communication among a plurality of the parts, entities, or players illustrated in FIG. 1, or any combination thereof. For example, the network 110 may be a combination of different networks, such as a private network made accessible by the server system 106 and the augmented reality enabled gaming device 104, separately, a public network (e.g., the Internet, etc.) through which the augmented reality enabled gaming device 104 and the server system 106 may communicate.

In the environment 100, the player 102 initiates the augmented reality enabled gaming device 104 and logs in to the server system 106 by accessing a webpage. The player 102 may then access and download a client-side application provided by the server system 106 that the player 102 wants to play. The client-side application may be a tabletop role-playing game (TRPG) or a tabletop miniature game (TMG). The player 102 may be able to view the physical gameplay surface of the tabletop 108 through the augmented reality enabled gaming device 104. The augmented reality enabled gaming device may include a camera that will facilitate the player 102 to broadcast the physical and augmented graphical content, as viewed through the gaming device.

In an embodiment, the player 102, wearing or viewing through an augmented reality enabled gaming device 104, may be able to mark the three-dimensional perimeter of the desired field of play on the physical tabletop 108. The perimeter may include length, width, and height along the x, y, and z-axis that may cover a section of the tabletop 108 that forms the field of play. A Euclidean space is determined based on the perimeter marked by the player 102. The Euclidean space is divided equally into a number of three-dimensional rectangular cells or cuboids. In an embodiment, the number of cuboids may be of equal volumes. The number of cuboids may form a virtual three-dimensional grid as viewed through the augmented reality enabled gaming device 104. The server system 106 is configured to calculate the total volume of the Euclidean space and divide the total volume into a pre-defined number of cuboids having equal volumes. Therefore, the server system 106 is configured to generate a stack of cuboids having equal volumes placed in the virtual field of play as viewed through the augmented reality enabled gaming device 104.

In another example embodiment, the server system 106 may enable the creation and use of an object library (the "OL") that stores a collection of virtual three-dimensional objects and characters. The OL may be stored in a memory of the server system 106 which could be an on-premise server incorporated with the augmented reality enabled gaming device 104, or a remote server located in the cloud storage. The virtual three-dimensional objects from the OL could be selected, modified and placed within a cuboid of the virtual three-dimensional grid, with each cuboid containing zero or one virtual three-dimensional object, to compose the place and/or terrain forming the virtual field of play that can be used to play an episode of tabletop gameplay. Using the movement of the player 102's hand as detected by the augmented reality enabled gaming device 104's hand movement tracker, the virtual three-dimensional grid could be rotated along each of its x-, y- or z-axis. In another embodiment, a small block of cuboids can be separated out of the virtual three-dimensional grid and could also be rotated using the hand movements detected by the augmented reality enabled gaming device 104. The desired virtual three-dimensional objects may then be placed inside the small block of cuboids by the player 102. The virtual three-dimensional objects can be dragged from a list shown in the user interface display ("UI") of the augmented reality enabled gaming device 104, onto any cuboids in the virtual three-dimensional grid or the small block of cuboids separated out of the virtual three-dimensional grid. In an alternate embodiment where the augmented reality enabled gaming device 104 does not include a hand movement tracker, a handheld controller paired to the augmented reality enabled gaming device 104 may be used to perform above mentioned operations.

After the completion of populating the desired cuboids with desired virtual three-dimensional objects, the server system 106 is configured to graphically fuse the virtual three-dimensional objects using a pre-defined set of rules. After fusing the desired virtual three-dimensional objects selected by the player 102, the server system 106 stores the corresponding field of play in a database against a unique identifier. The player 102 may search and retrieve the field of play from the server system 106 using the unique identifier. The placement of all the fused virtual three-dimensional objects in each cuboid is recorded in a field of play database (the "FPDB") and stored in the server system 106.

As a result of the fusing process, a holistic field of play is obtained by graphically fusing the desired virtual three-dimensional objects. The holistic field of play is then rendered by the server system 106 and made available to be displayed on the physical gameplay surface, as viewed through the augmented reality enabled gaming device 104. The holistic field of play is generated such that the individual virtual three-dimensional objects placed in selected cuboids are scaled and linked to the virtual three-dimensional objects placed in adjacent cuboids. The fusing process is performed to visually form a unified structure or terrain, as viewed through the augmented reality enabled gaming device 104. The resultant holistic field of play may be rendered to the augmented reality enabled gaming device 104. The holistic field of play is then assigned a unique identifier and stored as a file in the game repository in a server system 106. The server system 106 could be an on-premise server or a server located in the cloud. A three-dimensional or holographic image of the composed field of play and/or the selected characters can be viewed through the augmented reality enabled gaming device 104 by one or more local and/or remote players for an episode of the tabletop gameplay.

In another embodiment consisting of all players congregating in one geographical location, an episode of the tabletop gameplay is initiated by having players logging into the server system 106 with access to the GR. The players will select the desired field of play to be used in the present episode from the GR using a unique identifier. The file including the field of play is sent via the internet or data network to a centralized computer (e.g., the server system 106) or each player's gaming device. The centralized computer will determine the portion of the pre-rendered field of play and/or other computer-generated elements including UI that should logically be displayed on by the augmented reality enabled gaming device 104. The appropriate image is then displayed in each player's gaming device virtually superimposed onto the physical gameplay surface such as the physical tabletop 108. In case of a TRPG, a character is selected by each player for the episode of the tabletop game and displayed by the augmented reality enabled gaming device 104 in accordance with the above described method. The episode can then proceed in accordance with the rules of the game with communication among the players on the proceeding of the game. The proceeding of an episode is saved in the GR so that, in case of an incomplete episode, the game can be finished at a later time in accordance with the rules of the game.

Depending on the requirement of the tabletop game being played, the method enables the display of real-world elements (e.g., the physical table, dice roll or miniature figures) and computer-generated virtual elements (e.g., a field of play or selected characters) in a variety of display modes as viewed through the augmented reality enabled gaming device 104. For TMG, the player will see the physical miniature figures on the physical tabletop 108 within the field of view superimposed on the portion of the field of play. For TRPG, the player 102 can use the UI to choose between two viewing modes: (a) the view of the field of play from their character's perspective, or (b) a macro or a birds-eye view of the field of play around their character with certain limitations.

In another alternate embodiment, a plurality of players playing the same episode of the game may be dispersed geographically. The file may consist desired field of play is sent via the network 110 to a centralized computer (e.g., the server system 106) or each of the plurality of player's gaming device such as the augmented reality enabled gaming device 104 of the player 102 at the dispersed location. The centralized computer will determine the portion of the field of play that should be rendered and/or other computer-generated elements including UI that should logically be displayed by each of the gaming devices. Communication among the plurality of players on the proceeding of the game is achieved via voice through the server system 106 or via a separate voice-over-IP network. As in the previous embodiment, the proceeding of an episode is saved in the GR so that, in case of an incomplete episode, the game can be finished at a later time in accordance with the rules of the game.

Each of the geographically dispersed plurality of players will be able to observe the proceeding of the game as if they are congregated around the same physical table. For TMG, each remote player such as the player 102 will be able to see all the physical miniature figures placed on the remote physical table. This is facilitated through the camera attached to the augmented reality enabled gaming device 104 of the player 102 physically present at the physical tabletop 108. The character-view or macro-view display options available to players congregating in one location to play TRPG are also available to the plurality of players under this alternate multi-location embodiment.

In yet another alternate embodiment, the virtual three-dimensional objects stored in the OL and the field of play stored in the GR are licensed to the players. The licensing may be done based on the terms of a certain licensing agreement, by a third-party developer or game publisher (the "Licensor") for use by the licensee players. Based on the terms of the licensing agreement, the licensed virtual three-dimensional objects and/or places and terrains are licensed to the licensee for certain defined limited use or unlimited use. Furthermore, the licensing terms may or may not allow the licensee to alter, author, and/or add to the virtual three-dimensional objects and/or places and terrains stored in the OL and GR respectively as provided by the third-party developer or game publisher. Such licensing terms should also define the ownership of the altered, authored, or additional virtual three-dimensional objects and/or places and terrains deposited into the OL and GR. The ownership of the recorded proceeding of gameplay episodes stored in the OL or GR may also be defined in the licensing terms.

In this embodiment, the digital assets in an OL or complete field of play in a GR could also be created by any licensee players. The licensee players may create the digital assets, using approaches described herein or other approaches, to be licensed to other players in the community based on licensor's licensing terms.

In an additional alternate embodiment, software tools can be supplied to the players, by a third-party developer to enable the authoring and altering of virtual three-dimensional objects, characters and complete field of play. The virtual three-dimensional objects may be authored or altered by sketching, by alteration of existing three-dimensional objects, and/or by importation of external art. Similarly, the characters, and complete fields of play may also be authored or altered in the same manner by sketching, by altering the existing characters or fields of play, and/or by importation of external art.

In yet another alternate embodiment, an episode of the tabletop game played on a field of play is broadcasted live or replayed to a live stream channel for viewing by on-site or remote spectators with gaming devices. The episode of the tabletop game played on a field of play may also be re-rendered for viewing in 2D on video screens or online video sharing and streaming platforms. For this embodiment, an audience, including a plurality of viewers, can view a TMG through the perspective of a streaming player such as the player 102 physically present at the physical gameplay surface such as the physical tabletop 108. For TRPG, the audience can view the game from (i) the perspective of each viewer's chosen player in one of character or macro viewing mode as described above, (ii) the perspective of a chosen character among all characters, or (iii) the macro view of one chosen character.

In another example embodiment, tabletop gaming-related entertainment, tutorial and/or digital advertising content may be displayed to the players. The digital advertisement content may be displayed based on the identity, preference, demographics or other characteristics of the players such as the player 102 on the augmented reality enabled gaming device 104 before or after an episode of a game. For example, an introductory video of a new line of miniature figures or a new collection of TRPG characters can be shown only to players playing TMG or TRPG respectively, after they log in to the game via server system. Advertising revenue generated from displaying commercial content could also be used to offset the cost players incur subscribing to virtual three-dimensional objects, characters, a field of play, and/or other costs.

In an embodiment, a server system is configured to push digital content from the server system 106 or another advertisement or content distribution server to the augmented reality enabled gaming device 104. The digital content may include, tabletop gaming-related entertainment, tutorial and/or advertising content that are sent based on a player's gaming interest and preference as determined based on an analysis of the data stored in the repositories of the server system 106 including, but not limited to, data stored in the account & bookkeeping information repository and GR. In an embodiment, the digital content can be sent before or after an episode of a game or at an alternate time of the player's choosing. In an example, the digital content, in this case, an advertisement for miniature figures is displayed after the client-side application is downloaded and ran on the augmented reality enabled gaming device, but before the commencement of the game. In an alternate embodiment, the digital advertising content may be displayed at a time of players' choosing. For example, as the player 102 logs in to the server system 106, the server system 106 can determine what kind of digital content should be displayed and when, in order to enhance the gaming experience and/or optimize business objectives.

Figure 2:
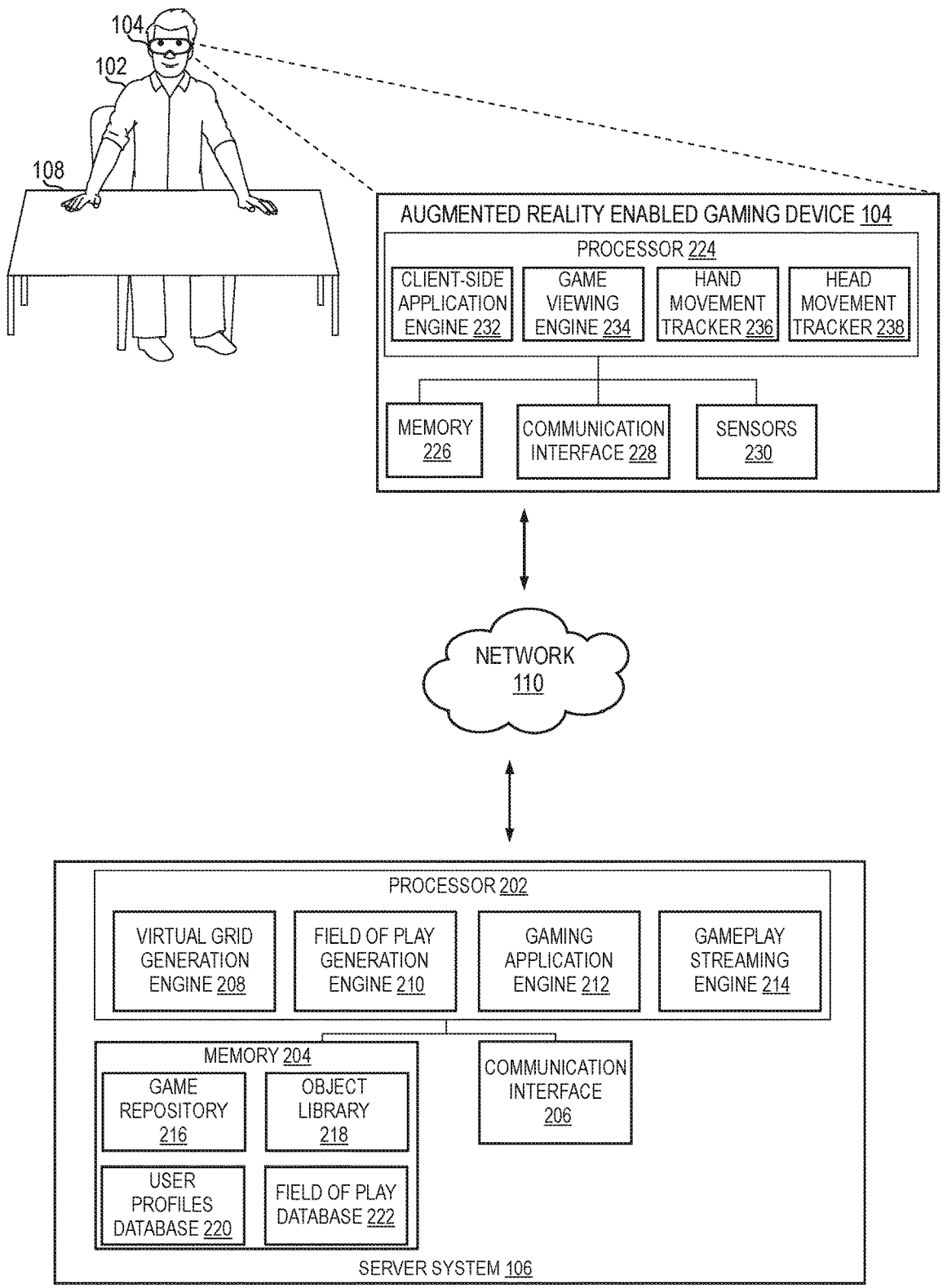
FIG. 2 is a block diagram of a server system and an augmented reality enabled gaming device, in accordance with some embodiments of the present disclosure.

FIG. 2 illustrates a simplified block diagram 200 including the augmented reality enabled gaming device 104 associated with the player 102, a server system 106, and the network 110, in accordance with an example embodiment. The server system 106 is shown including a processor 202, a memory 204, and a communication interface 206. The processor 202 further includes a virtual grid generation engine 208, a field of play generation engine 210, gaming application engine 212, and gameplay streaming engine 214. Memory 204 includes a plurality of repositories and libraries necessary for performing the aforementioned methods. The memory 204 may include a game repository (GR) 216, an object library (OL) 218, a user profiles database 220, and a field of play database (FPDB) 222. The augmented reality enabled gaming device 104 may also include components such as a processor 224, memory 226, communication interface 228, and sensors 230. The processor 224 of the augmented reality enabled gaming device 104 may further include a client-side application engine 232, game viewing engine 234, hand movement tracker 236, and a head movement tracker 238. The sensors 230 may include a plurality of sensors such as a camera, a gyroscope, and the like that enable the features provided by an augmented reality enabled device.

This setup of components and server systems may be utilized to facilitate generating and rendering of a virtual three-dimensional field of play including fused virtual three-dimensional objects for tabletop games, by the server system 106. The server system 106 may be a gaming server located at a remote location or may be incorporated with the augmented reality enabled gaming device 104 in some embodiments. The augmented reality enabled gaming device 104 may enable the player 102 to build virtual field of plays, and play episodes of games on the virtual field of play rendered on a physical gameplay surface.

In an embodiment, the player 102 associated with the augmented reality enabled gaming device 104 may initiate the augmented reality enabled gaming device 104 by switching it on and may log in to the server system 106. In an embodiment, if the player 102 is a new user and does not have an account at the server system 106, the player 102 may be facilitated to sign up to the server system 106. The user profiles database 220 may store the data related to all the players who have signed up to the server system 106. Further, after logging in, the player 102 may download a client-side application such as a TRPG or a TMG to play an episode of the application on the augmented reality enabled gaming device 104. In an embodiment, once the client-side application is downloaded from the server system 106, the player 102 can directly access the application and play the game. The client-side application engine 232 is configured to manage all the applications downloaded from the server system 106. Similarly, the gaming application engine 212 of the server system 106 is configured to provide the applications for download and features of it.

After the player 102 has downloaded the application, the player 102 may be capable of building a virtual field of play on a physical gameplay surface that the player 102 may be sitting in front of and wants to play an episode of the game on it. In an embodiment, the player 102 may be seated in front of a physical tabletop 108 wearing the augmented reality enabled gaming device 104 and log in to the server system 106 to build a virtual field of play to play an episode of a game on the virtual field of play. The player 102 may be facilitated to choose an origin and an outer extension of the desired field of play that he/she wants to play in. The origin and the outer extensions determine a perimeter of the field of play. The player 102 may be facilitated to mark the origin and draw the outer extensions along x, y, and z-axis using a UI provided to the player. The hand movement tracker 236 is configured to detect the hand movements and gestures performed by the player 102.

In the example embodiment, after the player has marked the perimeter, the augmented reality enabled gaming device 104 is configured to send the same to the server system 106. The virtual grid generation engine 208 is configured to first determine a Euclidean space covered by the perimeter of the field of play and then calculate the volume of the Euclidean space. The virtual grid generation engine 208 is further configured to divide the volume of the Euclidean space into a number of cuboids. In an example, the Euclidean space may be divided in such a way that the number of cuboids has equal volumes. In an embodiment, the server system 106 is configured to generate a virtual three-dimensional grid including the number of cuboids stacked upon and adjacent to each other along all the three dimensions. The processor 202 may then facilitate the rendering of the virtual three-dimensional grid and making it available to be displayed on the physical gameplay surface, as viewed through the augmented reality enabled gaming device 104. The player 102 may be able to view the virtual three-dimensional grid on the physical tabletop 108, as viewed through the augmented reality enabled gaming device 104.

In one example embodiment, after the player 102 can view the virtual three-dimensional grid, the player 102 may build a field of play on the virtual three-dimensional grid via the server system 106. In an embodiment, the player 102 may access the OL 218 to build the virtual field of play. A user interface screen including the plurality of virtual three-dimensional objects may be displayed to the player 102. The player 102 may be facilitated to drag and drop virtual three-dimensional objects on to cuboids present in the virtual three-dimension grid. In an embodiment, the augmented reality enabled gaming device 104 may provide a user interface to the player 102 that facilitates the player to drag and drop one virtual three-dimension object displayed on the UI screen onto a cuboid from the plurality of cuboids present in the virtual three-dimensional grid. The player 102 may be provided with a plurality of features so as to easily place the desired virtual three-dimensional object onto a desired cuboid in a required orientation. The process of populating the virtual three-dimensional grids to form a field of play is explained in detail in FIG. 5.

Further, after the player 102 has finished populating the desired cuboids with desired virtual three-dimensional objects, a save and render button may be present in the UI screen displayed to the player 102 through the augmented reality enabled gaming device 104. For example, if the player presses on the 'save' button, the information related to the corresponding field of play such as the orientation of virtual three-dimensional objects and the cuboid numbers, etc., may be stored in the FPDB 222. Further, the player 102 needs to press on the 'render' button on the UI screen. The 'render' button may facilitate the server system 106 to receive the desired selections of the player 102 and render a holistic field of play that could be displayed on the augmented reality enabled gaming device 104.

In an example embodiment, the field of play generation engine 210 of the server system 106 is configured to graphically fuse the plurality of virtual three-dimensional objects selected by the player. The field of play generation engine 208 may utilize a pre-defined set of rules to render a holistic field of play and display the holistic field of play on the augmented reality enabled gaming device 104. The pre-defined set of rules defines how the populated virtual three-dimensional grid is rendered with the different types of virtual three-dimensional objects that could be placed in the plurality of cuboids. The placement of a virtual three-dimensional object may be identified as "top", "bottom", "front", "back", "left" and "right" based on the orientation of the virtual three-dimensional object in a cuboid of the plurality of cuboids. For example, if a stone wall is placed in a cuboid to the left of another cuboid with a stone wall with the same orientation, then, the two stone wall units will be aligned and fused together. The fused objects may be displayed as a continuous stone wall with two units in length when viewed through the augmented reality enabled gaming device 104.

The pre-defined set of rules also defines the relative size of the virtual three-dimensional object. Virtual three-dimensional objects are scaled in the rendering process based on the relative size of adjacent objects and the total volume of the field of play so that the resultant field of play would appear to be properly proportioned. The rendering rules can be defined manually by the creator of the object based on the visual requirement of the objects placed in adjacent cuboids.

Further, the rendered field of play may be utilized by the player 102 to play an episode of a tabletop game along with a plurality of players. In an example, the plurality of players may be present at the same location viewing the field of play on a common physical gameplay surface, or in another embodiment, each of the players may be geographically dispersed. A lead player may be chosen from the plurality of players who may select a field of play from a plurality of field of plays stored in the FPDB 222. In an example of a TRPG, each of the plurality of players may choose a character and play according to the rules of the game and features of the character as defined by the developers.

In an embodiment, information related to an episode of gameplay that was played in the past or ongoing gameplay may be stored in the GR 216. The GR 216 includes a plurality of information fields explained in detail in FIG. 7. The players may complete an episode of the game and save it for further streaming or viewing or in some embodiments, the players may suspend an episode of the game in progress and the server system 106 may automatically save the proceedings and identifiers related to the gameplay in the GR for future use in case the players want to continue the same gameplay in the future. In another example, the game viewing engine 234 may be configured to facilitate the player 102 to record an ongoing gameplay and view it later by accessing a file stored in the GR 216.

In an example embodiment, an episode of the gameplay may be live-streamed on to an e-sport channel or any other gaming or viewing device such as a mobile phone, laptop, tablet, etc. The gameplay streaming engine 214 is configured to facilitate the lead player such as the player 102 to choose an option to live stream an ongoing episode of gameplay that can be viewed by any gaming or viewing devices. In an additional embodiment, the episode of the gameplay may be live-streamed onto a two-dimensional screen with an option to display a 360-degree field of view of the field of play.

In another additional embodiment, the players such as the player 102 may be facilitated to generate their own virtual three-dimensional objects such as terrains and structures. Developer options may be given to the players enabling them to draw a virtual three-dimensional object and upload it to the OL 218 and use it for building field of plays. The players may be rewarded for doing the same, in some embodiments.

In an additional alternate embodiment, software tools can be supplied to the player 102, by a third-party developer to enable the authoring and altering of virtual three-dimensional objects, characters and complete field of play. The virtual three-dimensional objects may be authored or altered by sketching, by alteration of existing three-dimensional objects, and/or by importation of external art. Similarly, the characters, and complete fields of play may also be authored or altered in the same manner by sketching, by altering the existing characters or fields of play, and/or by importation of external art.

In another example embodiment, tabletop gaming-related entertainment, tutorial and/or digital advertising content may be displayed to the player 102. The digital advertisement content may be displayed based on the identity, preference, demographics or other characteristics of the player 102 on the augmented reality enabled gaming device 104 before or after an episode of a game. For example, an introductory video of a new line of miniature figures or a new collection of TRPG characters can be shown only to players playing TMG or TRPG respectively after they log in to the game via server system 106. Advertising revenue generated from displaying commercial content could also be used to offset the cost players incur subscribing to virtual three-dimensional objects, characters, a field of play, and/or other costs.

Figure 3:
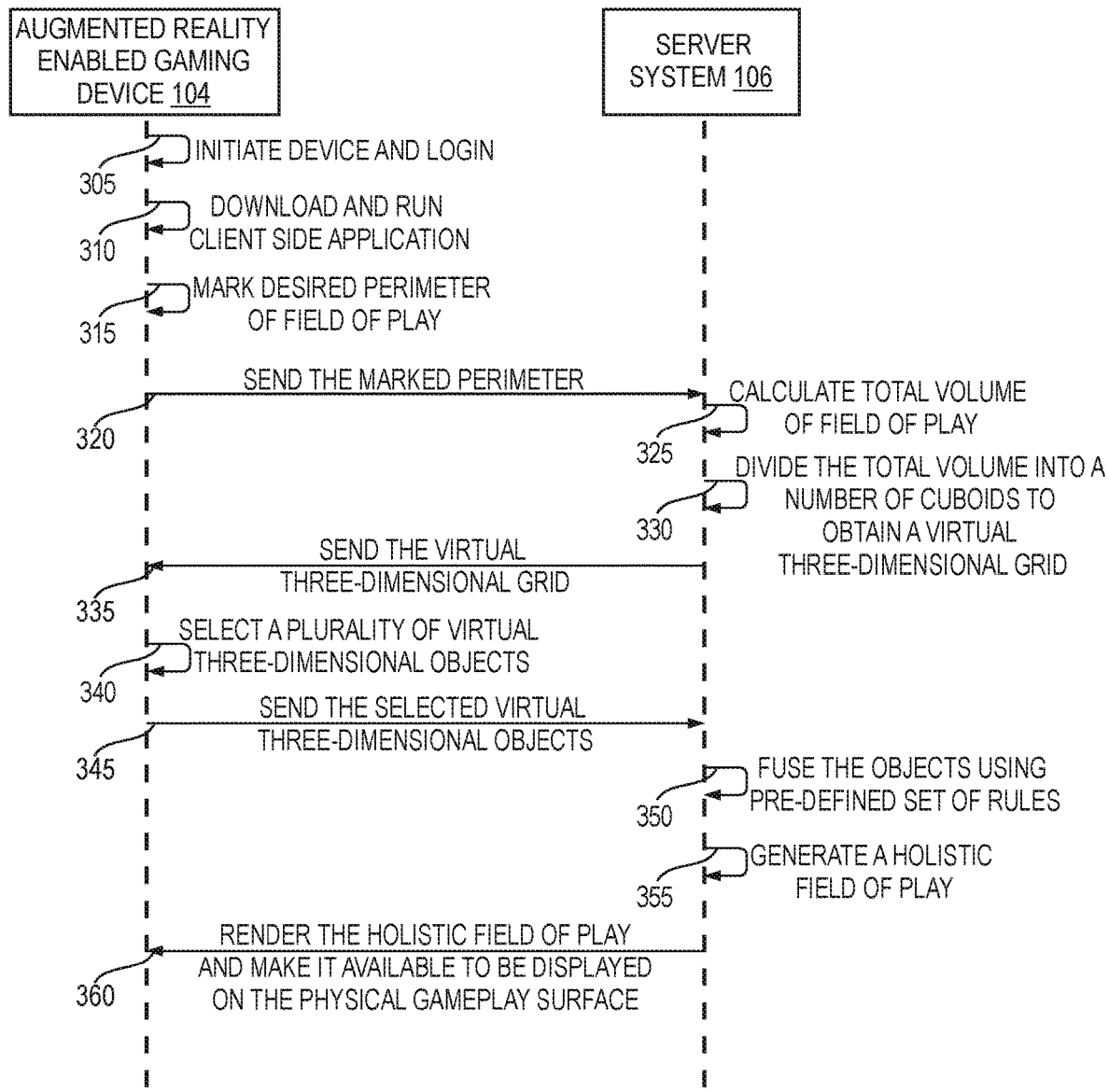
FIG. 3 is a sequence flow diagram for generating a virtual three-dimensional grid and rendering a holistic field of play to the virtual three-dimensional grid.

Turning now to FIG. 3, a sequence flow diagram 300 for rendering a virtual three-dimensional field of play as viewed through the augmented reality enabled gaming device 104, is shown, in accordance with an example embodiment. The sequence of operations of the sequence flow diagram 300 may not be necessarily executed in the same order as they are presented. Further, one or more operations may be grouped together and performed in the form of a single step, or one operation may have several sub-steps that may be performed in parallel or in a sequential manner.

At 305, the player 102 may initiate the augmented reality enabled gaming device 104 by switching it on and logs in to the server system 106 by accessing a webpage through the internet (e.g., network 110 of FIG. 1). In an embodiment, the player 102 may be a new user and he/she will be provided an interface to sign up to the server system 106 and continue.

At 310, after logging in, the player 102 may download the client-side application such as a TRPG or a TGM. The player 102 may then run the game to start and play the game on the augmented reality enabled gaming device 104.

At 315, the player 102 may mark the desired perimeter of the field of play that he/she wants to play an episode of the game in, on the physical gameplay surface of the tabletop 108. Marking the desired perimeter includes selecting a point of origin and drawing an outer extension of the desired field of play along the three dimensions x, y, and z-axis. The player 102 may mark this using his/her hand and the hand movement tracker of the augmented reality enabled gaming device 104 may be able to track the movements of the player 102's hand. The hand movements of the player 102 may be displayed as a cursor or a pointer as viewed through the augmented reality enabled gaming device 104. The cursor or the pointer may be moved inside the field of view of the augmented reality enabled gaming device 104 accordingly, as seen by the player 102. Various gestures defined by the augmented reality enabled gaming device 104 may be used to perform various operations on the augmented reality enabled gaming device 104 using the hand movement tracking device 106. In an example, the player may tap on a point on the physical gameplay surface of the tabletop 108 to mark that point as the origin and then draw outer extensions of the desired field of play along all three dimensions (x, y and z-axis) marking the length, width, and height of the field of play.

At 320, the perimeter marked by the player 102 may be sent to the server system 106 from the augmented reality enabled gaming device 104. The player 102 may be presented with a 'send' button on the user interface of the augmented reality enabled gaming device 104.

At 325, the processor 202 of the server system 106 is configured to calculate the total volume of the field of play based on the perimeter received from the augmented reality enabled gaming device. The server system 106 may first determine a Euclidean space of the field of play based on the length, width, and height of the field of play marked by the player 102. Further, the total volume of the Euclidean space of the field of play may be calculated by the server system 106 using a formula to calculate the volume of a cube or a cuboid.

At 330, the processor 202 of the server system 106 may further divide the total volume of the field of play into a number of cuboids to obtain a virtual three-dimensional grid. In an embodiment, the number of cuboids may be of equal volumes. A virtual three-dimensional grid may be a stack of the number of cuboids having equal volume forming a grid along the x, y, and z-axis. Therefore, dividing the total volume of the field of play into a number of cuboids will result in obtaining a virtual three-dimensional grid. At 335, the server system 106 is configured to facilitate the rendering of the virtual three-dimensional grid to the augmented reality enabled gaming device 104. The virtual three-dimensional grid may be viewed through the augmented reality enabled gaming device 104.

After the player 102 is able to view the virtual three-dimensional grid through the augmented reality enabled gaming device 104, the player may access the OL 218 of FIG. 2, through the augmented reality enabled gaming device 104 to populate the virtual three-dimensional grid to compose a field of play. The OL 218 includes a collection of a plurality of virtual three-dimensional objects that the player 102 may use to build a holistic field of play in which the player 102 can play episodes of games along with other players.

At 340, the player 102 may select a plurality of virtual three-dimensional objects from the OL 218. A user interface may be displayed to the player 102 that allows the player 102 to drag and drop the plurality of virtual three-dimensional objects into each cuboid of the number of cuboids that may have equal volumes. The OL 218 may include a plurality of structures, terrains, geographic features, etc. The player 102 may populate the virtual three-dimensional grid using the virtual three-dimensional objects contained in the OL 218. In an embodiment, the player 102 may be able to separate out a single cuboid out of the virtual three-dimensional grid and rotate the grid or rotate the virtual three-dimensional object to the desired orientation to populate the respective cuboid.

At 345, after the player 102 has populated the desired cuboids with zero or one virtual three-dimensional object, the player may save and send the field of play to the server system 106. The field of the play refers to the complete set of all the virtual three-dimensional objects in their desired orientations to be populated in respective cuboids within the virtual three-dimensional grid.

At 350, the processer 202 of the server system 106 is configured to fuse the objects using a pre-defined set of rules. The processor 202 may be configured to graphically fuse all the virtual three-dimensional objects selected by the player 102 using a pre-defined set of rules. The pre-defined rules may include executable programs that may be stored in the memory of the server system 106. The executable codes, when executed, may enable the processor to graphically fuse all the virtual three-dimensional objects using the desired scale and orientation. The process of fusing the plurality of virtual three-dimensional objects may obtain a holistic field of play on which the player 102 may play an episode of a TRPG or a TMG. At 355, the processor may generate the holistic field of play based on the fusing performed at 350. The holistic field of play is ready to be rendered on any gaming device such as the augmented reality enabled gaming device 104.

At 360, the server system 106 is configured to render the holistic field of play and make it available to be displayed on the physical gameplay surface, as viewed through the gaming device 104 of the player 102. The rendered holistic field of play is such that all the virtual three-dimensional objects placed within the virtual three-dimensional grid will appear to fuse together logically to display a holistic field of play as viewed through the gaming device 104. The rendered graphical file is then given a unique identifier and stored in the field of play database 222 of FIG. 2.

Figure 4A:
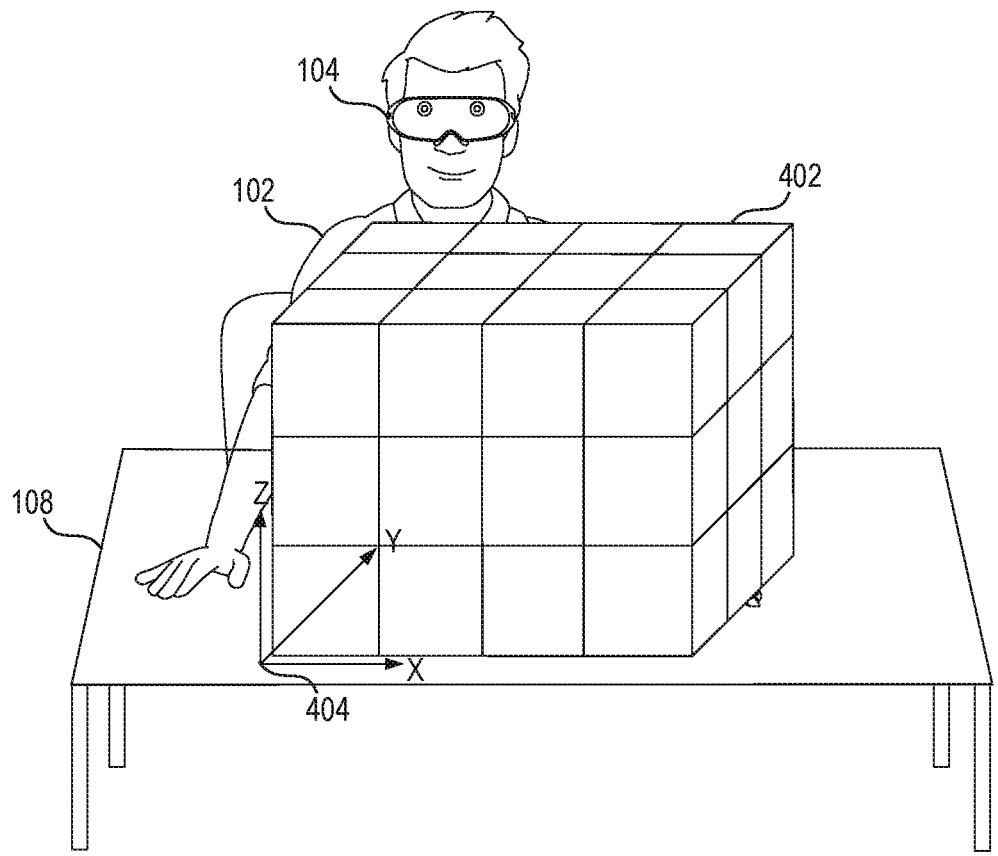
FIG. 4A is a diagram depicting the unpopulated virtual three-dimensional grid composing of a number of cuboids, as viewed through the augmented reality enabled gaming device, in accordance with some embodiments of the present disclosure.

FIG. 4A is a diagram 400 depicting an unpopulated virtual three-dimensional grid 402 composed of a number of cuboids, as viewed through the augmented reality enabled gaming device 104, in a preferred embodiment. The player 102 wearing the augmented reality enabled gaming device 104 is shown to be seated in front of a physical gameplay surface such as the physical tabletop 108. A marking 404 including the origin and the outer extension of all the three axes i.e., x, y, and z-axis for the desired virtual three-dimensional grid is exemplarily shown. The marking 404 may not be visible to the player 102 through the augmented reality enabled gaming device 104. The unpopulated virtual three-dimensional grid 402 may be rendered by the server system 106 and available to be displayed on the physical gameplay surface, as viewed through the augmented reality enabled gaming device 104. The virtual three-dimensional grid 402 appears to be projected on top of the physical tabletop 108 (or any physical flat surface), as viewed through the augmented reality enabled gaming device 104 where one or more episodes of TRPG or TMG may be played. In an embodiment, the player 102 can select any logical point as the origin and the x, y, and z-axis along which the virtual three-dimensional grid 402 will be placed and may be viewed through the augmented reality enabled gaming device 104.

Figure 4B:
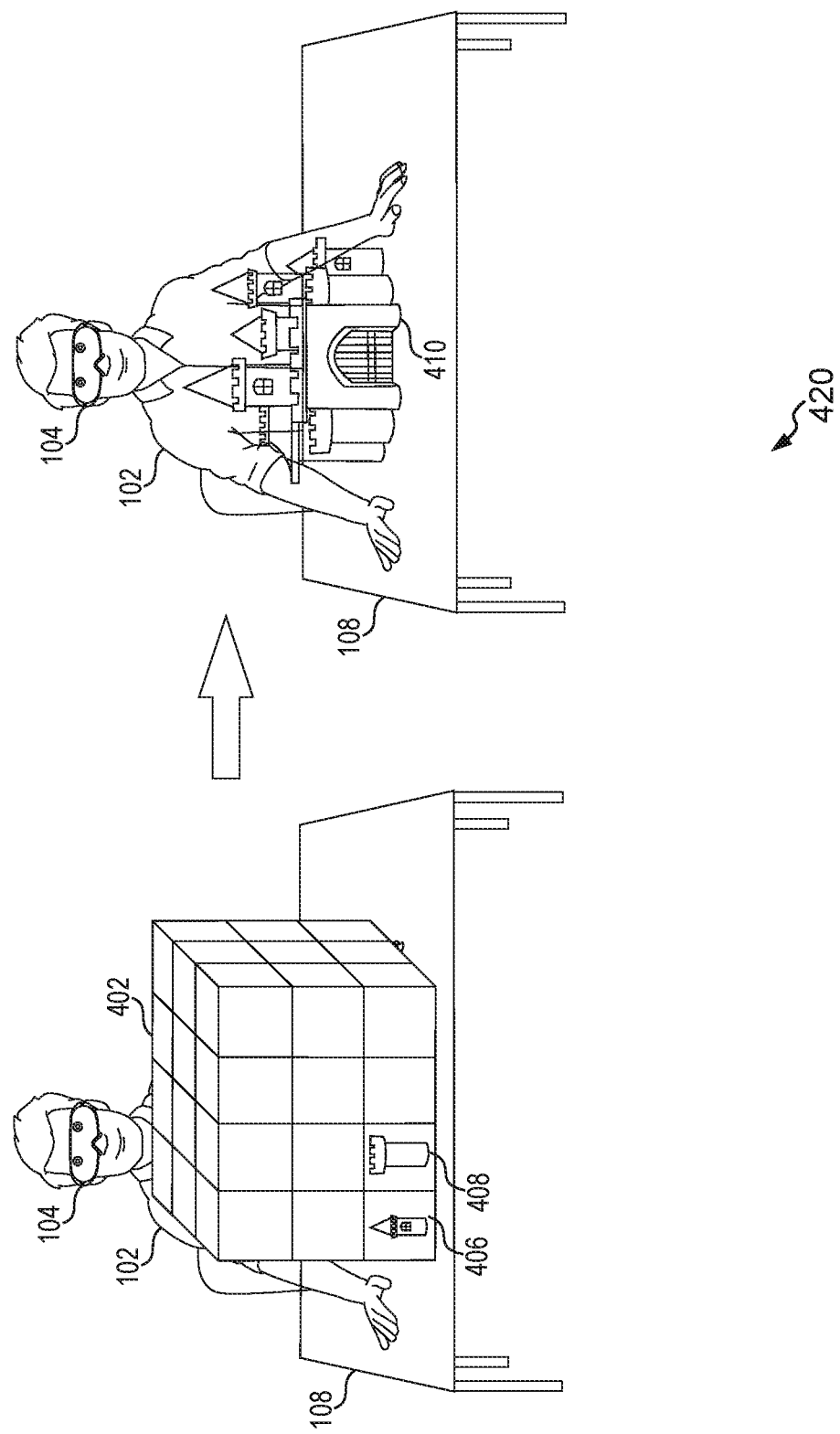
FIG. 4B is a diagram showing the end to end illustration of the process of creating a field of play, in accordance with some embodiments of the present disclosure.

FIG. 4B is a diagram showing the end to end illustration 420 of the process of creating a holistic field of play 410, in a preferred environment. The player 102 wearing the augmented reality enabled gaming device 104 may populate the desired cuboids of the virtual three-dimensional grid 402 with a plurality of virtual three-dimensional objects from the OL 218. The process of populating the virtual three-dimensional grid 402 is exemplarily shown in the left side of the illustration 420. It is exemplarily shown that the player 102 has chosen two virtual three-dimensional objects 406, 408, and has populated two of the number of cuboids. In an embodiment, the player 102 may populate the desired cuboids with such desired virtual three-dimensional objects and save the selections for the field of play and send the selection to the server system 106 to generate a holistic field of play 410.

In an example embodiment, the player 102 may be displayed a UI from which the player 102 may drag and drop the plurality of virtual three-dimensional objects onto the cuboids of the virtual three-dimensional grid 402. After the player 102 has finished populating the same, the player 102 may press a 'save' button to save the plurality of desired virtual three-dimensional objects and their orientations and respective location within cuboids in the virtual three-dimensional grid 402. Not all cuboids within the three-dimensional grid will contain a virtual three-dimensional object. The orientations, location and the virtual three-dimensions objects selected by the player 102 may be stored in the FPDB 222. After the player 102 has finished saving the orientations, location and the plurality of three-dimensional objects, the player 102 may press on a 'render' button to send a signal to the server system to render a holistic field of play 410 including the selected virtual three-dimensional objects.

In the embodiment, the field of play generation engine 210 of the server system 106 may be configured to graphically fuse the plurality of virtual three-dimensional objects selected by the player 102 using a pre-defined set of rules. Graphically fusing the virtual three-dimensional objects results in a holistic field of play that looks like a single logically fused structure through the augmented reality enabled gaming device 104. In the illustration 420, the holistic field of play 410 may be displayed on the physical tabletop 108 as viewed through the augmented reality enabled gaming device 104 by the player 102.

Figure 5:
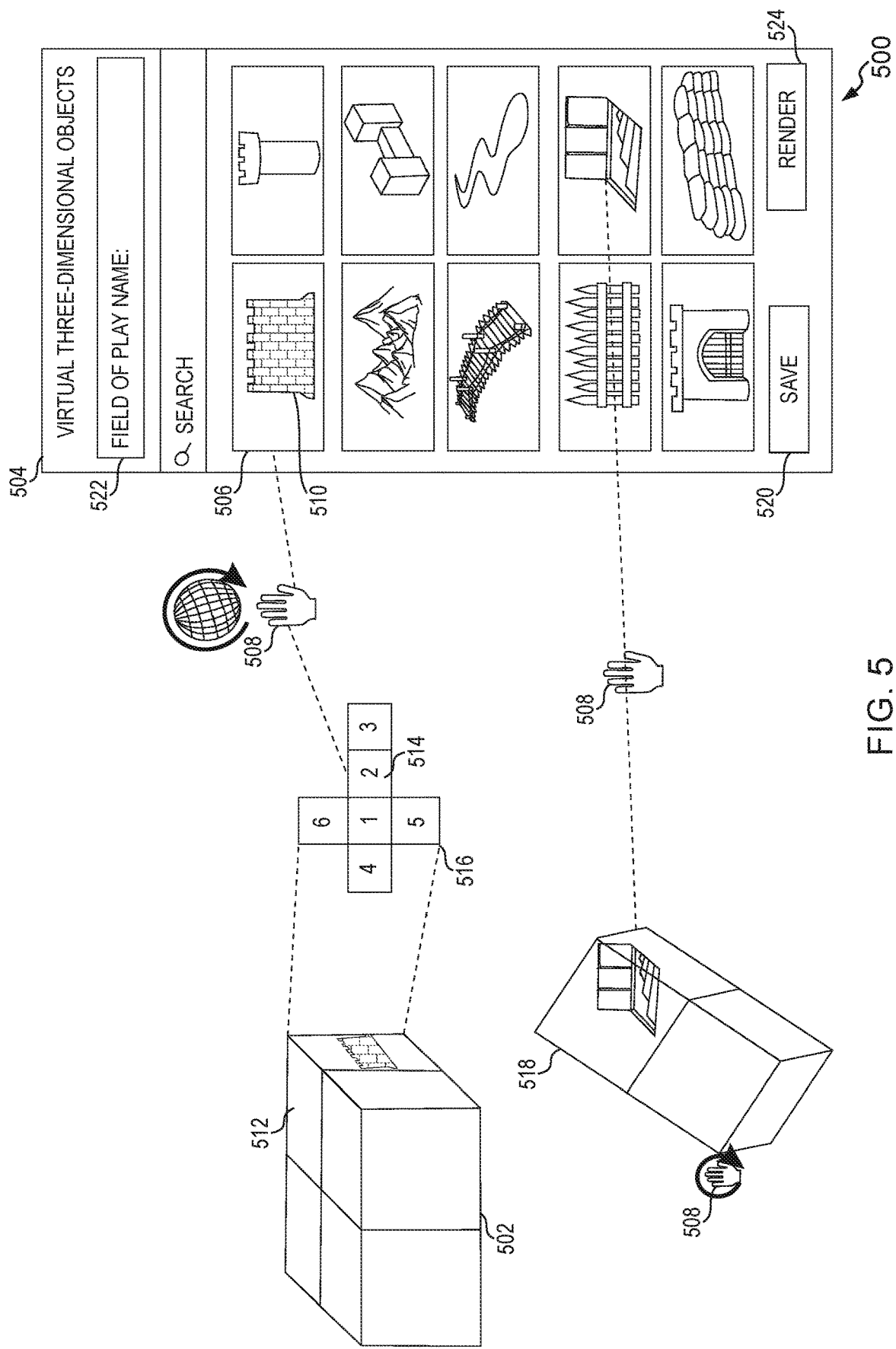
FIG. 5 is a diagram showing how objects in an object library (OL) are selected and oriented to populate selected cuboids in a virtual three-dimensional grid to create the field of play, in accordance with some embodiments of the present disclosure.

FIG. 5 is a representation 500 showing how objects in the OL are selected and oriented to populate selected cuboids in a virtual three-dimensional grid such as the virtual three-dimensional grid 502. The virtual three-dimensional grid is shown in the representation 500 including 4 cuboids, to create the holistic field of play. The virtual three-dimensional objects contained in the OL are displayed in a UI screen 504 of the augmented reality enabled gaming device 104. The player 102 can use the OL's search function to search for the desired object by entering a tag or keyword into the search box of the UI screen 504. A keyword can be related to multiple objects and all potential matches from the search can be displayed in one or more selection boxes such as a selection box 506. Besides using the search function, the selection result boxes could also be populated based on computer-based machine learning of the player's preference or past actions. For example, there is a high probability that the player 102 might place a guard tower after selecting and placing a number of castle wall segments. Therefore, a selection of guard towers objects is automatically shown in the selection boxes such as the selection box 506, saving the players' effort in entering the search term via the UI.

Upon finding the desired virtual three-dimensional object, the player 102 can use hand gesture as detected by the hand movement tracker 236 of the augmented reality enabled gaming device 104 (as shown in FIG. 2), to grab, drag and drop the selected virtual three-dimensional object onto the desired cuboid. This is achieved by player 102 placing their hand exemplarily shown as hand 508 in the representation 500, on the desired object in the selection box 506 as if grabbing a hold onto the virtual three-dimensional object. The player 102 may then close their first and drag or move the object to the desire cuboid, and let go by the opening of the first while the hand 508 is positioned over the desire cuboid as viewed through the augmented reality enabled gaming device 104. Depending on the design of the augmented reality enabled gaming device 104 and/or UI software, different action or a physical external controller might be required to perform the above function. For example, the player 102 may point to the desired object in the selection box, and press down with the pointing finger by slightly advancing the finger towards the image of the virtual three-dimensional object as viewed through the augmented reality enabled gaming device 104 to select the object. The player 102 may then move the finger to the desired cuboid without letting go of the object, then may let go on top of the desired cuboid by "dropping" or releasing the object by slightly pulling back the finger. A mind-computer interface device can also be used to perform the function of selecting and depositing selected objects into desired cuboids of the virtual three-dimensional grid 502.

After the selected object is deposited onto the desired cuboid, the object can be manipulated to achieve the desired orientation. In this embodiment, the orientation of a virtual three-dimensional object within a cuboid is to which face of the cuboid is the face of the virtual three-dimensional object aligned with. For example, the virtual three-dimensional object may be a stone wall 510 oriented facing cuboid 512's face number 2, marked as 514, shown in the net diagram 516 of the cuboid 512. The net diagram 516 of the cuboid 512 is the two-dimensional shape that can be folded to form a three-dimensional cuboid. The orientation of the virtual three-dimensional object can be set using a variety of UI techniques including, but not limited to, pointing or grabbing onto the virtual three-dimensional object within the cuboid 512 and virtually rotating it such that it faces the desired face of the cuboid 512. Another approach is to select the virtual three-dimensional object within the cuboid 512 and then point to the desired face on the net diagram 516 shown in the representation 500.

In an additional embodiment, to facilitate the deposit of virtual three-dimensional objects into the cuboids among a large block of cuboids, a block of cuboids 518 can be separated from another block of cuboids such as the virtual three-dimensional grid 502 by hand gesture. A column of the block of cuboids 518 directly adjacent to where the desired separation is going to occur, is grabbed or pointed to and virtually moved in an opposite direction away from the other virtual three-dimensional grid 502. Cuboids located in the interior of the virtual three-dimensional grid 502 are thus exposed for the virtual three-dimensional objects to be deposited into the block of cuboids 518. The block of cuboids 518 could also be rotated by grabbing onto or pointing to the block of cuboids 518 and rotating the hand 508 as if holding onto the block of cuboids 518 and rotating them. A virtual three-dimensional object can then be conveniently deposited into the exposed cuboid using hand gestures or other UI interactions.

In an example embodiment, the placement of virtual three-dimensional objects onto the desired cuboids within the virtual three-dimensional grid can be automatically or manually saved in the FPDB 222. The player 102 may be able to save the field of play manually by pressing on the "save" button 520. When the composition of a field of play is first saved, the players will be asked to enter field of play name 522 which may be uniquely identifiable for the field of play being composed. The players can complete the composition of a particular field of play in one or more sessions with the progress of each session saved to the FPDB 222 under the same field of play name. When the composition of the field of play is completed, the players can instruct the server system 106 to render the completed field of play, in accordance with the pre-defined set of rules described in the OL 218 by clicking the "render" button 524 in the UI screen 504.

Referring now to FIG. 6, it represents a table 600 of structured data related to the virtual three-dimensional objects stored in the OL 218. The OL 218 is configured to store all the information related to the plurality of virtual three-dimensional objects that can be populated onto the cuboids of a virtual three-dimensional grid. The virtual three-dimensional objects that can be selected to populate the virtual three-dimensional grid are stored in the OL which is a data repository stored in the memory 204 of the server system 106.

In an example embodiment, the table 600 may include a plurality of information fields such as for example, an object identifier (see, 602), an image (see, 604), a type (see, 606), a rendering rules (see, 608), tags (see, 610), an attribute (see 612), and other information (see, 614). The object identifier 602 may be a unique identifier that is given to the virtual three-dimensional object by the developers of the game. The image 604 represents the graphical representation of the virtual three-dimensional object. Further, the type 606 represents a classification of the virtual three-dimensional object. The type can be one of a structure (e.g., walls, rampart, towers, stairs, etc.), terrain (e.g., river, hills, plain, mountains, etc.), geographic feature (e.g., forest, dam, trench, bush, etc.), and character (e.g., warrior, fairy, gargoyle, princess, etc.). The rendering rules 608 represent a pre-defined set of rules to be used by any processor of a system to graphically fuse the virtual three-dimensional object with its adjacent objects selected by the player 102. The tags 610 represent keywords that may be utilized to get the virtual three-dimensional object as a result of using the search tab displayed on the UI of the augmented reality enabled gaming device 104. The attributes 612 represent who has the right to utilize the virtual three-dimensional object. For example, a "community" object can be used by any authorized player within the community (e.g., a defined group) as determined through the login process. However, a "private" object can only be used by a particular player or a pre-defined group of players. Further, the other information 614 represents any extra information related to the virtual three-dimensional object stored against the object identifier 602. For example, a player might be charged a fee for the use of certain objects. Another example of "other information" might be a rating of the desirability of the object as input by players.

In an embodiment, the rendering rules 608 define how this object is rendered with the different types of virtual three-dimensional objects that could be placed in the six adjacent cuboids identified as "top", "bottom", "front", "back", "left" and "right" based on the orientation of the virtual three-dimensional object in the cuboid. For example, if a stone wall is placed in a cuboid to the left of another cuboid with a stone wall with the same orientation, then, the two stone wall units will be aligned and fused together and displayed as a continuous stone wall two units in length when viewed through the augmented reality enabled gaming device 104. The rendering rules also define the relative size of the virtual three-dimensional object. Virtual three-dimensional objects are scaled in the rendering process based on the relative size of adjacent objects and the total volume of the field of play so that the resultant field of play would appear to be properly proportioned. The rendering rules can be defined manually by the creator of the object based on the visual requirement of the objects placed in adjacent cuboids. In an additional embodiment, the server system may also determine, based on machine learning of human-defined rules, the optimum rules that can be used to scale and fuse the objects to create the field of play.

In one example, the virtual three-dimensional object may be a stone wall. The object identifier for the stone wall may be "2141". An image of the stone wall may be stored in the OL against the object identifier. The type of the object is structure since the stone wall is a structure. And the rendering rules may be top: 271, front: 365, back: 465, left: 350, and right: 620, and bottom: 340. The tags may be a castle, stone wall, parapet, defense, etc. The attribute may be private to a defined group where only the players in that defined group can access the corresponding object.

Referring now to FIG. 7, it represents a table 700 of structured data related to the episodes of games stored in the GR 216. The GR 216 is configured to store information regarding the episodes of games played by the players including a plurality of data fields. The GR 216 may be utilized by players to continue a suspended game or check back a completed game in the past. In an embodiment, information regarding the ongoing games is also stored in the GR 216.

In an example embodiment, the table 700 may include a plurality of information fields such as for example, a field of play ID (see, 702), a game identifier (see, 704), record (see, 706), a time stamp (see, 708), player ID and character (see, 710), a game state (see, 712), a log (see, 714), notes (see, 716), and other information (see, 718). The field of play ID represents a name or a unique ID assigned to a field of play built by a player such as the player 102. The players may assign the ID to each of the fields of play. The game identifier 704 represents the unique identifier assigned for an episode of a game being played, or already played by the player 102. The record 706 refers to an option if the player had chosen to record the gameplay or not. Only yes or no may be stored against the field record 706. Time stamp 708 represents the date and time of the end time of a gameplay which has already been played. Ongoing episodes of games may not be applicable for storing the time stamps. Further, the player ID and character 710 refer to a unique ID of the player who has participated or is participating in a gameplay along with the chosen character of the player for a TRPG. No chosen character is required for TMG, so therefore, the character identifier is blank or noted as "N/A". Game state 712 represents the state of the gameplay whether it is suspended, or completed, or ongoing. The log 714 represents the latest log that was saved for the corresponding gameplay. It can be the last action for suspended and ongoing games and game results for a completed game. Notes 716 represent optional written notes entered by the lead player or admin through the UI. The notes could be any narration related to the game or the current episode of the game that the lead players would like to memorialize. Other information 718 represents any management information relating to the game including, but not limited to, the computer storage location of the 3D computer graphics generated by the rendering of the FPDB, timing of live stream broadcasted, or scheduled, viewership analytics data, etc.

In an example, the field of play ID may be "TRPG-Castle ACDX" assigned by the player 102. The game identifier for the corresponding gameplay may be "AX89". The player 102 may have chosen to record the gameplay. The record field may be stored with "yes". The time stamp may be in an YYYY-MM-DD format followed by an hh-mm-ss format. The player ID and character may be "Player X+ char. 0718" representing the player X's ID and the character ID of the character chosen by the player. The game state may be "suspended" representing that the gameplay was aborted in the middle of a game by the players. The log may be "last action" since the game was suspended.

Games can be categorized into various states as recorded in the GR. A game could be suspended meaning that the current episode of the game has been terminated and the players can jointly agree to restart the game from where they left off in a future time by initiating a new episode of the game. An ongoing game is one that is being played at the current moment. In an example, a TRPG may be being played as noted in the field of play ID 702 and therefore, a chosen character is required for each player whereas, for a TMG, a character is not required as physical miniature figures are used to play the game. A completed game is one that has been played to its logical conclusion in accordance with the rules of the game.

In an additional embodiment, the game identifier 704 may be "unplayed" for a game whose field of play is not being used in any ongoing or suspended game. A lead player can initiate a new game by selecting the field of play using its unique identifier noted.

Figure 8:
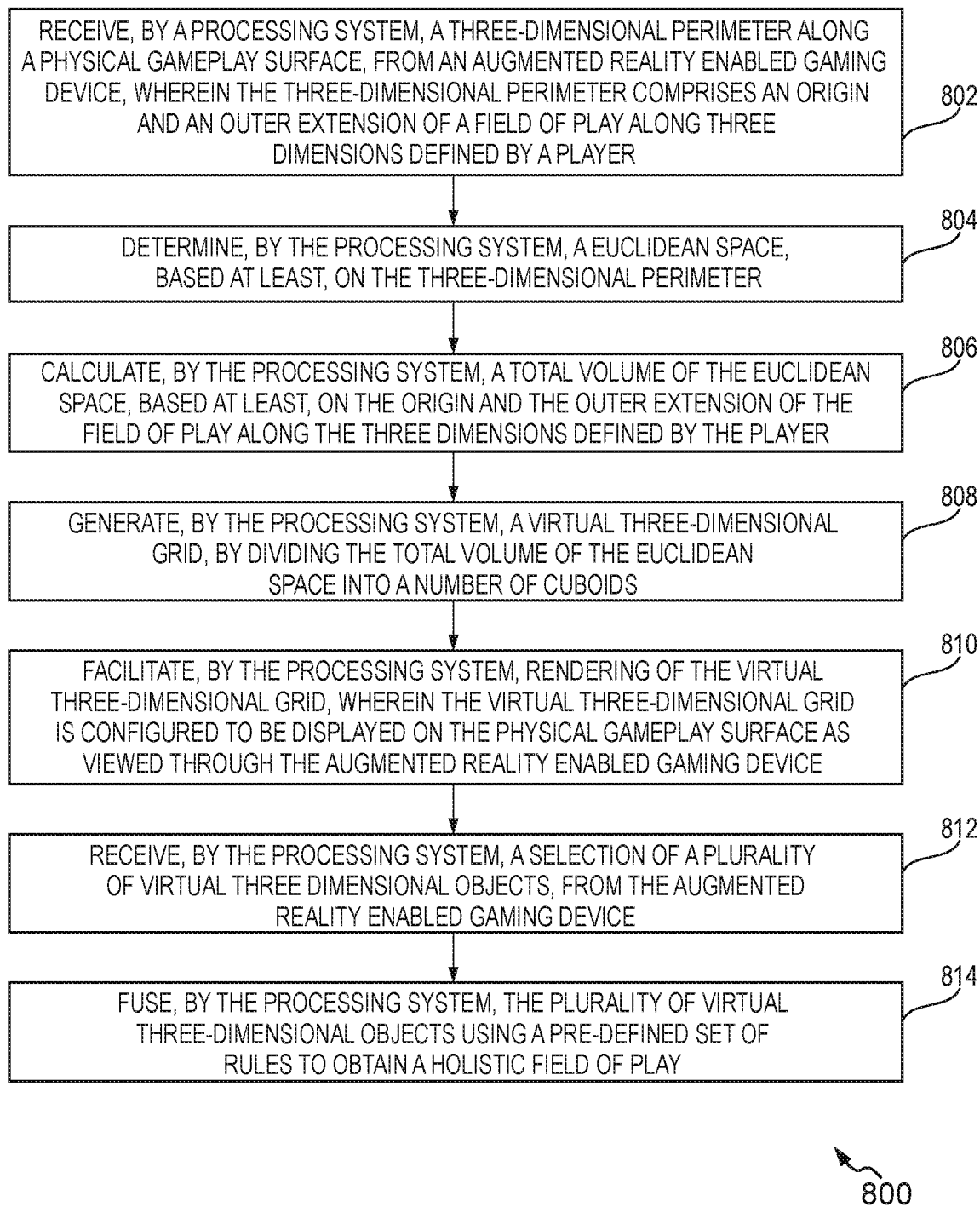
FIG. 8 illustrates a flow diagram of a method for rendering a virtual three-dimensional field of play for AR-enhanced gameplay, in accordance with an example embodiment.

Referring now to FIG. 8, a flow diagram of a method 800 for rendering a virtual three-dimensional field of play for AR-enhanced gameplay, is shown in accordance with an example embodiment. The method 800 depicted in the flow diagram may be executed by, for example, a server system such as the server system 106. Operations of the method 800, and combinations of operation in the method 800, may be implemented by, for example, hardware, firmware, a processor, circuitry, and/or a different device associated with the execution of software that includes one or more computer program instructions. The method 800 starts at operation 802.

At 802, the method 800 includes, receiving, by a processing system such as the server system 106, a three-dimensional perimeter along a physical gameplay surface such as the physical tabletop 108, from an augmented reality enabled gaming device 104. The three-dimensional perimeter may include an origin and an outer extension of a field of play along three dimensions defined by the player 102.

At 804, the method 800 includes, determining, by the processing system such as the server system 106, a Euclidean space, based at least, on the three-dimensional perimeter. The Euclidean space may be the total space that the perimeter may be covering based on the origin and the outer extension defined by the player 102.

At 806, the method 800 includes, calculating, by the processing system such as the server system 106, a total volume of the Euclidean space, based on the origin and the outer extension of the field of play along the three dimensions defined by the player 102.

At 808, the method 800 includes, generating, by the processing system such as the server system 106, a virtual three-dimensional grid such as the virtual three-dimensional grid 402 of FIG. 4A, by dividing the total volume of the Euclidean space into a number of cuboids. In an example embodiment, the constituent cuboids within the virtual three-dimensional grid 402 may be of equal volume.

At 810, the method 800 includes, facilitating, by the processing system such as the server system 106, rendering of the virtual three-dimensional grid such as the virtual three-dimensional grid 402. The virtual three-dimensional grid may be configured to be displayed on the physical gameplay surface such as the physical tabletop 108 as viewed through the augmented reality enabled gaming device 104.

At 812, the method 800 includes, receiving, by the processing system such as the server system 106, a selection of a plurality of virtual three dimensional objects, from the augmented reality enabled gaming device 104. The virtual three dimensional objects may be displayed to the player 102 on a user interface of the augmented reality enabled gaming device 104. The player 102 may drag and drop the desired virtual three-dimensional objects and press an actionable button on the user interface to send the selection to the server system 106.

At 814, the method 800 includes, fusing, by the processing system such as the server system 106, the plurality of virtual three-dimensional objects using a pre-defined set of rules to obtain a holistic field of play such as the holistic field of play 410 of FIGS. 4A and 4B.

Figure 9:
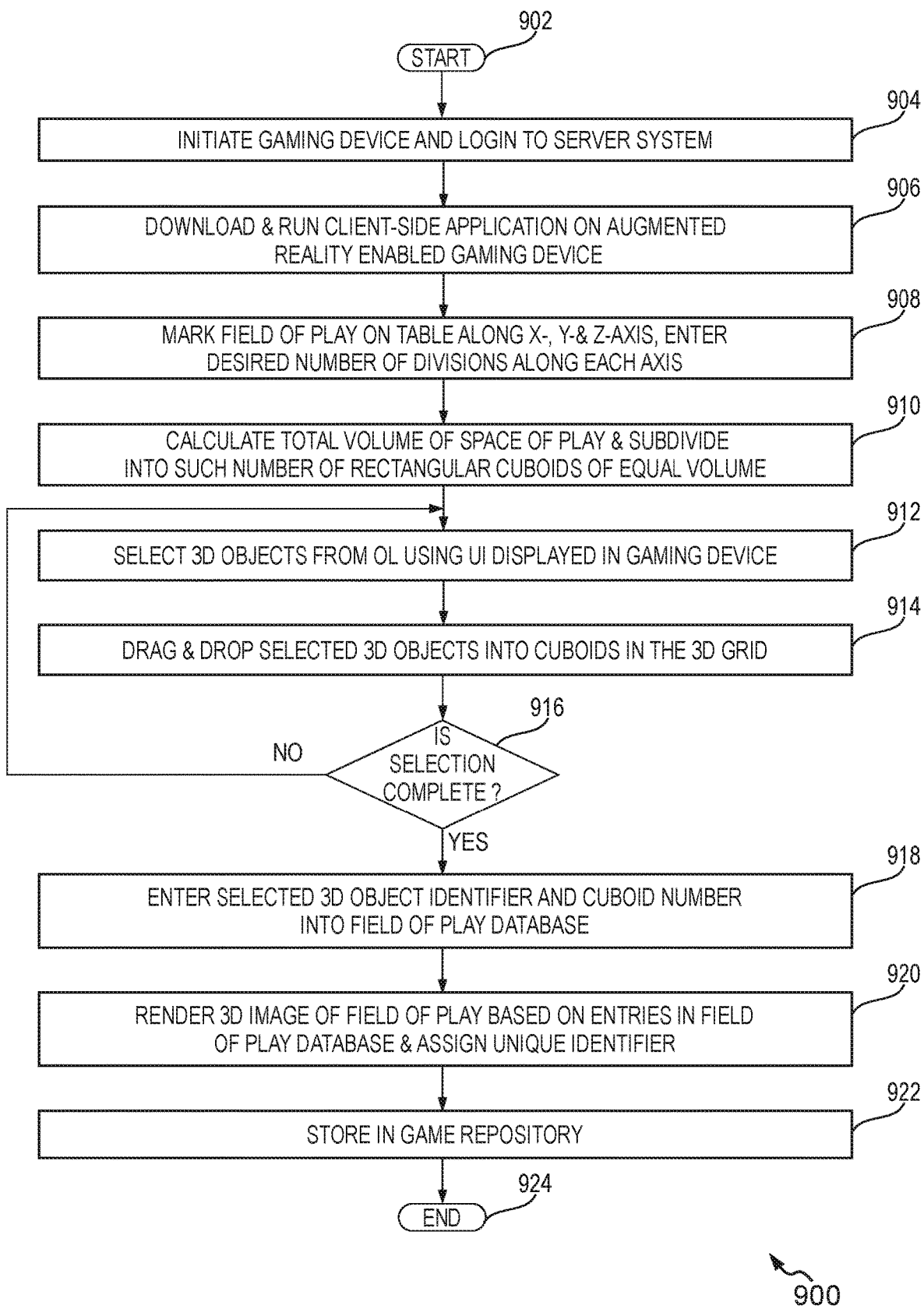
FIG. 9 is a flow diagram outlining the steps in generating a virtual three-dimensional grid and populating the grid with virtual three-dimensional objects to create a holistic field of play, in accordance with an example embodiment.

FIG. 9 is a flow diagram 900 outlining the steps in generating a virtual three-dimensional grid and populating the grid with virtual three-dimensional objects to create a holistic field of play, in a preferred embodiment. To create a field of play, a specialized gaming device such as the augmented reality enabled gaming device 104, integrated with hand movement tracking, head movement tracking, and forward camera capabilities may be utilized by a player such as the player 102. A gaming device with said added capabilities may include smart glasses or AR headsets. Operations and combinations of operation depicted in the flow diagram 900, may be implemented by, for example, hardware, firmware, a processor, circuitry and/or a different device associated with the execution of software that includes one or more computer program instructions. The operation starts at operation 902.

The process may start at 902. At 904, the player 102 may initiate the augmented reality enabled gaming device 104 and log in to the server system 106. The server system 106 may be a computing device including a processing system, connected to the augmented reality enabled gaming device 104 via a data network.

At 906, the augmented reality enabled gaming device 104 may be utilized by the player 102 to download a client-side application required to perform the operations outlined in FIG. 9, from the server system 106 and executed by the augmented reality enabled gaming device 104. The client-side application may be a TRPG or a TMG.

At 908, viewing through the augmented reality enabled gaming device 104, the player 102 may mark the desired perimeter of the field of play along the length, breadth, and height of the physical tabletop along the x, y, and z-axis. Depending on the capability of the augmented reality enabled gaming device 104, one method of defining the length, width, and height of the field of play is to use the hand movement tracker capability of the augmented reality enabled gaming device 104. The player 102 will point to the desired (i) origin, and (ii) outer extension of the field of play along the x-, y- and z-axis using hand gesture, or in case of an AR headset without hand tracking, clicking on the hand-held controller and UI wherever appropriate. The data points are sent from the augmented reality enabled gaming device 104 to the server system 106.

At 910, the components present in the processor 202 of the server system 106 may calculate the volume of the field of play in Euclidean space as defined by the origin and the outer extension of the field of play along the x-, y- and z-axis. The server system 106 may further divide the total volume of the field of play into a number of cuboids. In an example embodiment, the number of cuboids may be divided such that all the cuboids are of equal volumes. In another embodiment, the player 102 may also choose a desired number of divisions along the x, y, and z-axis and the dividing of the total volume of the Euclidean space may also consider the desired number of divisions. In the preferred embodiment, as viewed through the augmented reality enabled gaming device 104, the three-dimensional space above the physical tabletop 108 is divided into a stack of cuboids forming a virtual three-dimensional grid.

At 912, the player 102 may choose to populate the virtual three-dimensional grid with a plurality of virtual three-dimensional objects to form a field of play. The player 102 may select a plurality of virtual three-dimensional objects from a UI displayed based on a searching operation performed on the content of the OL 218. The virtual three-dimensional objects selected to be included in the field of play can be selected from a region in the UI of the augmented reality enabled gaming device 104 and dragged-and-dropped onto the virtual three-dimensional grid at 914. The select-drag-drop process can be achieved through various means including, but not limited to, using and detecting the hand gesture of virtually grabbing the selected image of a virtual object presented in the UI and then moving the image onto the desired cuboid. The object can also be rotated to the correct orientation. The hand gesture is detected and recorded by the hand movement tracker 236 built into or external to the augmented reality enabled gaming device 104.

At 916, if the player 102 has completed building the field of play, the player 102 may save the field of play and proceed to press 'render' button displayed on the UI. If the player 102 has not completed populating the virtual three-dimensional grid, the process may repeat from step 912. In an embodiment, the player 102 may save the field of play that he/she has built by populating the desired cuboids of the virtual three-dimensional grid with virtual three-dimensional object, by pressing on a 'save' button on the UI. At 918, the server system 106 may store the virtual three-dimensional object identifiers and their orientation in desired cuboid numbers in the FPDB 222.

Further, the player may choose to press the render button displayed on the UI, to receive a holistic field of play as viewed through the augmented reality enabled gaming device 104, from the server system 106. At, 920, the server system 106 may graphically fuse and render the virtual three-dimensional objects in accordance with a pre-defined set of rules so that all the virtual three-dimensional objects placed within the virtual three-dimensional grid will appear to fuse together logically to display a holistic field of play as viewed through the augmented reality enabled gaming device 104. The rendered graphical file is then given a unique identifier and stored in the GR 216 at 922. The operation ends at 924.

Figure 10:
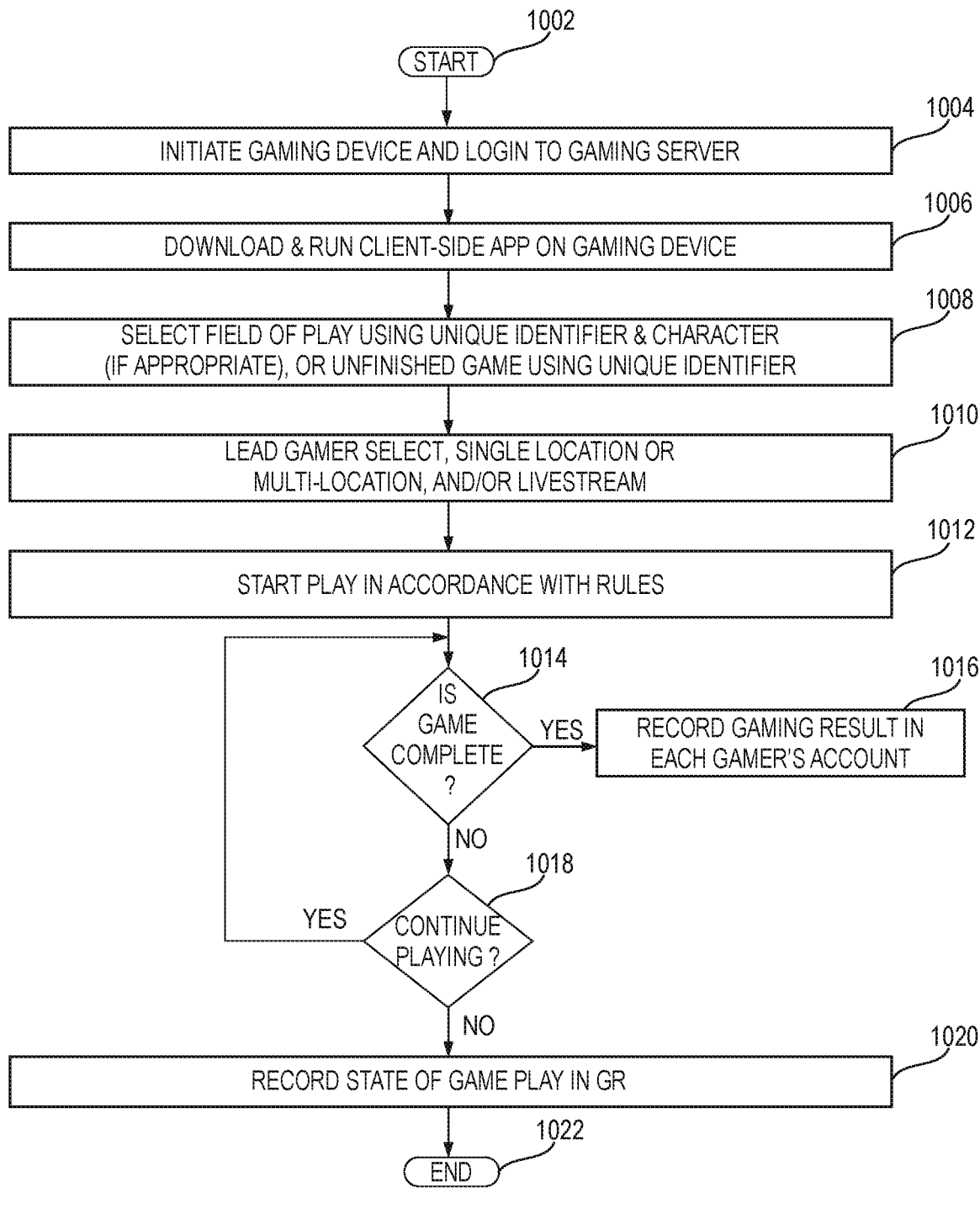
FIG. 10 is a flow diagram outlining the steps in playing a tabletop role-playing game (TRPG) or tabletop miniature game (TMG), in accordance with an example embodiment.

FIG. 10 represents a flow diagram 1000 outlining the steps in playing a tabletop role-playing game (TRPG) or tabletop miniature game (TMG), in a preferred embodiment. A tabletop game with AR-enhanced gameplay experience can be played using a virtual field of play by players located in one or many geographically dispersed locations. Operations and combinations of operation depicted in the flow diagram 1000, may be implemented by, for example, hardware, firmware, a processor, circuitry and/or a different device associated with the execution of software that includes one or more computer program instructions. The operation starts at operation 1002.

At 1004, one or more players such as the player 102 will initiate their respective augmented reality enabled gaming devices such as the augmented reality enabled gaming device 104, as shown in FIG. 9. The players may then log in to the server system 106. Players who already have an account at the server system 106 may be able to log in, whereas a new player may be provided an option to sign up to the server system 106 to facilitate the AR-enhanced gameplay.

At 1006, a client-side software application such as the TRPG or TMG for the augmented reality enabled gaming device 104 may be downloaded to the augmented reality enabled gaming devices of the players, from the server system 106, if this is the first time the player is playing the game. If the player already has the game downloaded on the augmented reality enabled gaming device, the player may be facilitated to directly start the game.

In an example embodiment, one of the players may be designated as the lead player for the corresponding episode of the gameplay. At 1008, the lead player such as the player 102 may select a field of play using the unique identifier for the field of play. Further, if required as per the rules of the game, for example in a TRPG, each player will select their character from the UI displayed to them on their respective augmented reality enabled gaming devices 104. In an example, the episode of the gameplay may be a new gameplay with a new field of play and character set or a continuation of a previous episode of an unfinished gameplay. The lead player may select a previously played episode of the gameplay using a unique identifier saved in the GR 216. Relating to a continuation of a previously unfinished gameplay, the new episode will commence from the last stored state or narrative of the previous episode.

Further, at 1010, the lead player will also be able to choose whether the game will be played in a single location or multiple, geographically dispersed locations, and/or whether the game will be live streamed. Live streaming a gameplay enables an audience of non-participating persons to view the field of play and the proceeding of a live or pre-recorded game in three-dimension or two-dimension using a gaming device or other devices.

At 1012, the game can be played in accordance with the rules of classical tabletop games with no change to the style of play but only with AR-enhanced player experience showing a lifelike field of play and characters across one or more geographical locations.

At 1014, the game will proceed until it is completed in accordance with the rules of the game. If completed, at 1016 upon the completion of the game, the gaming result will be recorded and stored in the GR 216.

If the game is not completed, at 1018 the lead player can either continue playing the episode of gameplay or suspend the episode of the gameplay at any time.

If the player does not continue and suspends the gameplay, at 1020, the information related to the gameplay such as the state of gameplay and other information will be recorded in the GR 216. As indicated, a suspended game can be resumed with the same set of players at a later time. The process ends at 1022.

Figure 11:
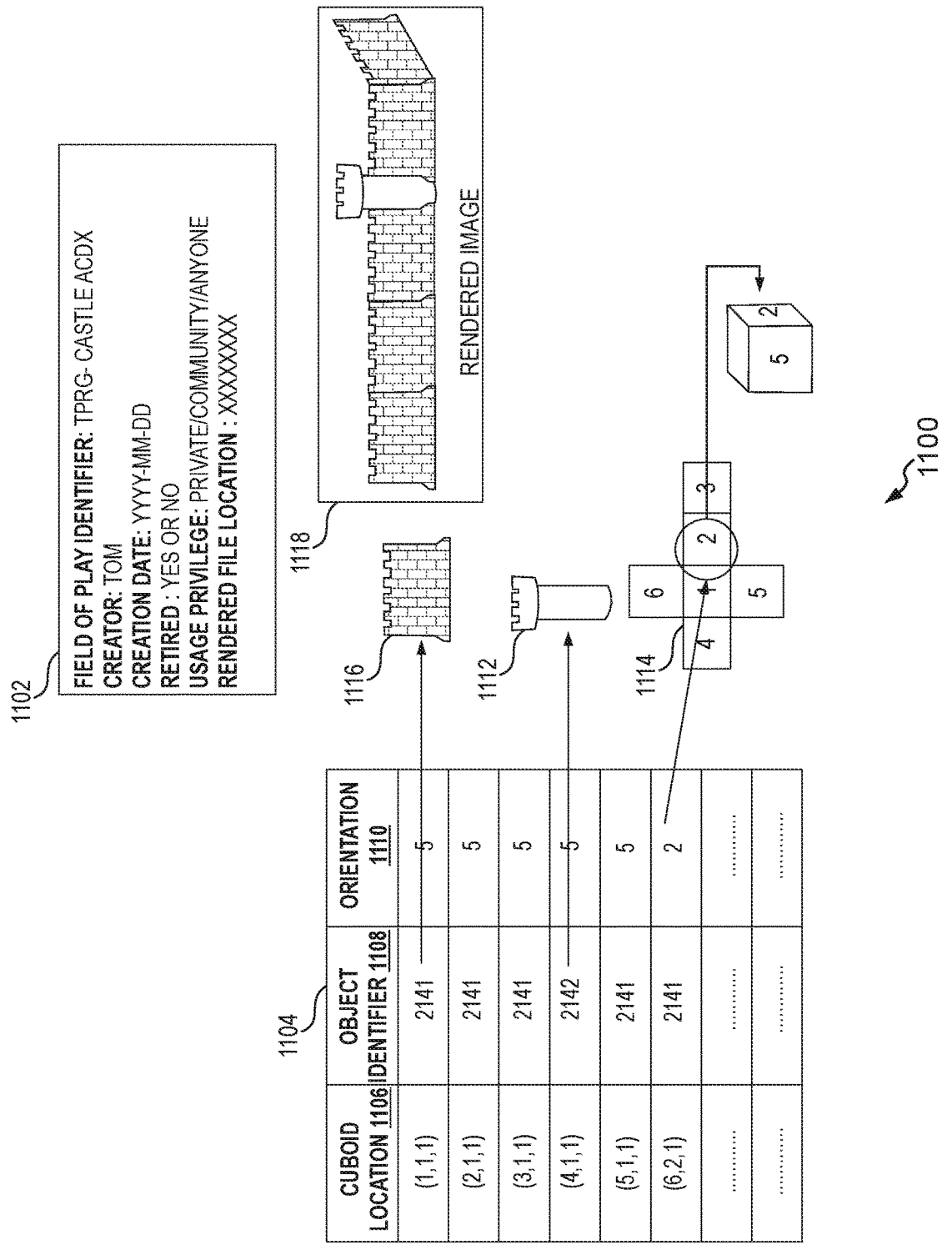
FIG. 11 is a diagram explaining how the field of play database (FPDB) can be utilized to render the field of play, in accordance with an example embodiment.

FIG. 11 is a representation 1100 explaining how the field of play database (FPDB) can be utilized to render the field of play, in a preferred embodiment. The representation 1100 illustrates the use of the field of play database (FPDB 222) to store the composition information of fields of play. In an embodiment, each field of play may be stored against a plurality of information 1102. The plurality of information 1102 may include data fields such as a field of play identifier, creator, creation date, retired, usage privilege, and rendered file location. The field of play identifier represents the unique identifier assigned to the field of play built by the player. The name of the creator identifies the person that creates this field of play using the method as described previously. The creation date represents the date that the field of play was created by the player. Retirement status indicates whether the field of play has been retired or no longer in use. The usage privilege represents who can use this field of play, be it (i) private (only the creator), (ii) community (anyone belonging to a defined community of players), or (iii) anyone. Further, the rendered file location represents where the three-dimensional graphical rendering of the field of play can be found within the server system 106.

Further, the field of play database includes a table 1104 containing three columns. The table 1104 may include information fields such as for example, a cuboid location (see, 1106), an object identifier (see, 1108), and an orientation (see, 1110). The cuboid location 1106 represents the coordinate (a,b,c) which determines the location of one of the plurality of cuboids within the virtual three-dimensional grid as "a", "b" and "c" from the origin set by the players along the x-, y- and z-axis respectively. The object identifier 1106 represents the unique identifier of the virtual three-dimensional object placed in the corresponding cuboid identified in the cuboid location defined in 1106, by the player 102 using the process described in FIG. 5. The orientation 1110 indicates which face of the cuboid is the front of the object facing.

In an example, a guard tower 1112 with object identifier "2142" may be located in cuboid location (4,1,1) which is the fourth cuboid from the origin along the x-axis, and first cuboid from the origin on the y- and z-axis. It is oriented to have its front wall parallel to face 5 of the cuboid as shown in the net diagram 1114 of the cuboid. In another example, the object stone wall 1116 with object identifier "2141" is shown to be placed in a cuboid location (6,2,1), the object is oriented with its front wall parallel to face 2 of the cuboid.

In an example embodiment, each cuboid in the virtual three-dimensional grid contains zero or one virtual three-dimensional object. Not all cuboids are listed in the FPDB 222. The cuboids that are not listed may contain no virtual three-dimensional object and will be rendered as blank space in the rendered image. In TRPG that requires characters, the characters can only occupy blank spaces or cuboid with zero virtual three-dimensional objects. The rule of the game will determine whether a character can traverse between two blank spaces separated by a space occupied by another virtual three-dimensional object. For example, a warrior character will not be able to traverse across a stone castle wall but will be able to traverse a stream.

In the embodiment, if the field of play associated with a plurality of information 1102 and the table 1104 shown in FIG. 11 is rendered, the rendered image 1118 may show four units of stone castle wall 1116 along the x-axis with a guard tower 1112 between the third and fourth stone castle wall unit 1116 from the origin. An additional stone castle wall unit 1116 is placed perpendicular to the fourth stone castle wall unit 1116 as shown.

Figure 12:
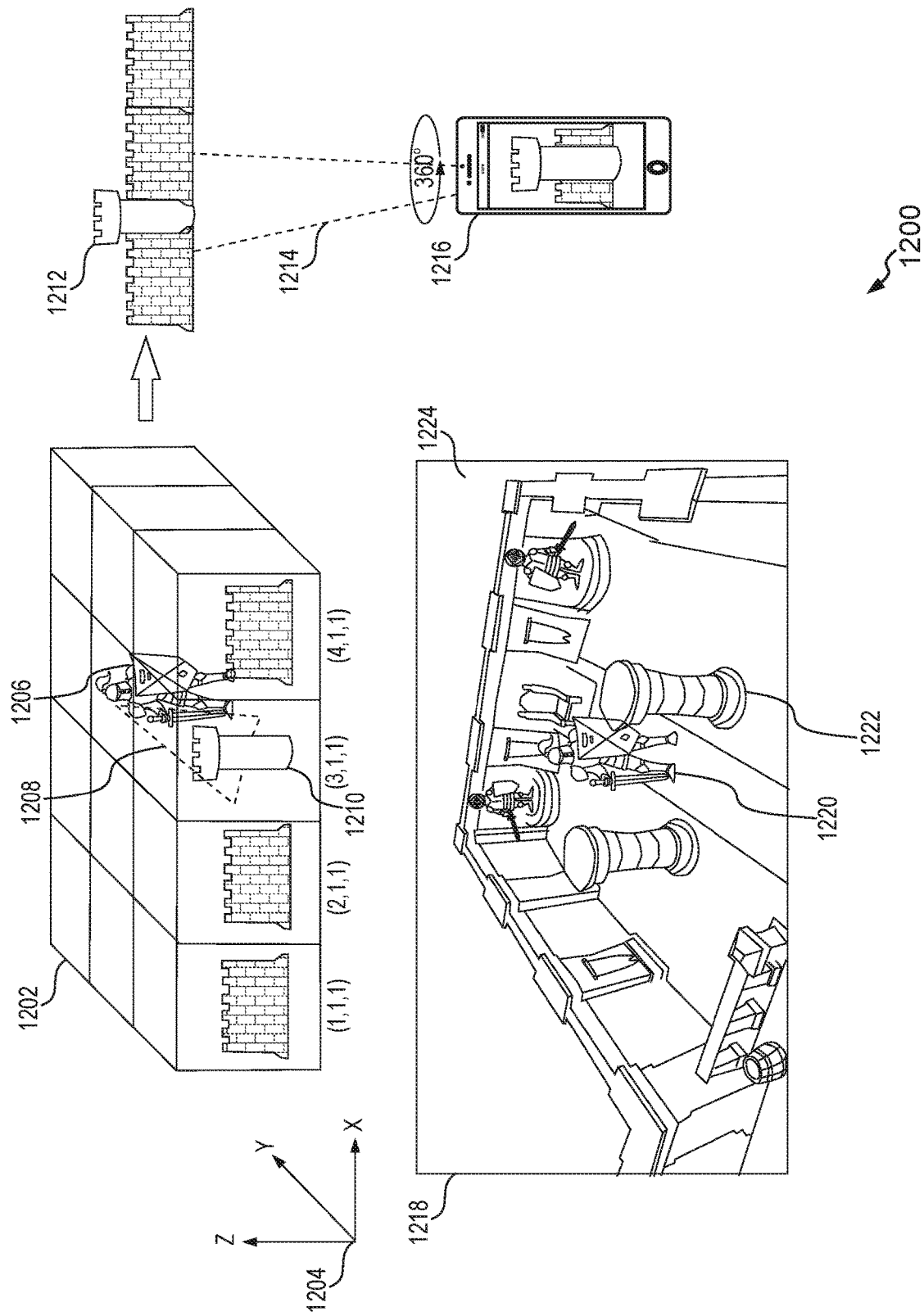
FIG. 12 is a diagram showing an alternate way a tabletop game is displayed or live streamed in character-view or macro-view display modes in a role-playing game in an alternate embodiment.

FIG. 12 is a representation 1200 showing an alternate way a tabletop game is displayed or live streamed in character-view or macro-view display modes in a role-playing game in an embodiment. The representation 1200 shows how a TRPG is viewed by a player such as the player 102 and/or an audience. There are two ways the player 102 can view the proceeding of a TRPG, one being, from the point of view of a character in the game. The second one being, from a macro view. In this case, the player 102 can be a remote participant, or someone physically situated at the physical gameplay surface where the field of play is being rendered. For the audience, they can (i) share the same view as the player of their choice among a plurality of players; (ii) view from the perspective of a chosen character among all characters; or (iii) watch in a macro view of a chosen character. In all cases, the view through the gaming or viewing device is rendered by a centralized server (e.g. the server system 106) and displayed by the gaming or viewing device.

In the case of viewing the game from the point of view of a character in the game, take for example a virtual three-dimension grid 1202 of a particular field of play with a marked origin and x-, y- and z-axis 1204, the field of play has a line of stone walls with coordinates (1,1,1), (2,1,1), and (4,1,1) and a guard tower 1210 at coordinate (3,1,1) between the second and third segment of the stone walls. For the character 1206 located at coordinate (3,2,1) looking toward the guard tower 1210, when live-streamed to an audience viewing using viewing device 1216, their field of view 1214 can be rendered by the server system 106 to show the same field of view 1208 as the character 1206. As the character 1206 moves their head from right to left, the audience will be able to see the segments of the rendered image 1212 including stone walls at (1,1,1), (2,1,1) and (4,1,1), and the guard tower at (3,1,1) as rendered by the server system 106. In an alternate implementation, the audience can pan their viewing device 1216 to instruct the server system to provide a 360° view from the point of view of the character.

A macro view 1218 allows the player 102 and/or an audience to view the character 1220 situated within a relevant portion of the field of play from a birds-eye perspective. Only the portion of the field of play adjacent to the character 1220 is rendered with clarity. Structural elements like the roof, ceiling or upper floors of a building, for example, that obstruct the view of the character 1220 in a lower floor room are not rendered so that the character can be seen by the player and/or an audience. To be realistic, the support structure 1222 is displayed, but not the roof, ceiling, or upper floors of a building that it supports. Furthermore, areas adjacent to the room that the character 1220 is situated at that are beyond the logical field of view of the character 1212 because of visual barriers 1224 are masked to avoid metagaming. Metagaming refers to enabling the player 102 and/or an audience to see what is hidden to their characters in the next room and therefore impacting the thrill of the game. In an additional embodiment, an artificial intelligence programming technique can be used in developing the rendering function so as to determine what can or cannot be logically seen in this macro view.

Figure 13:
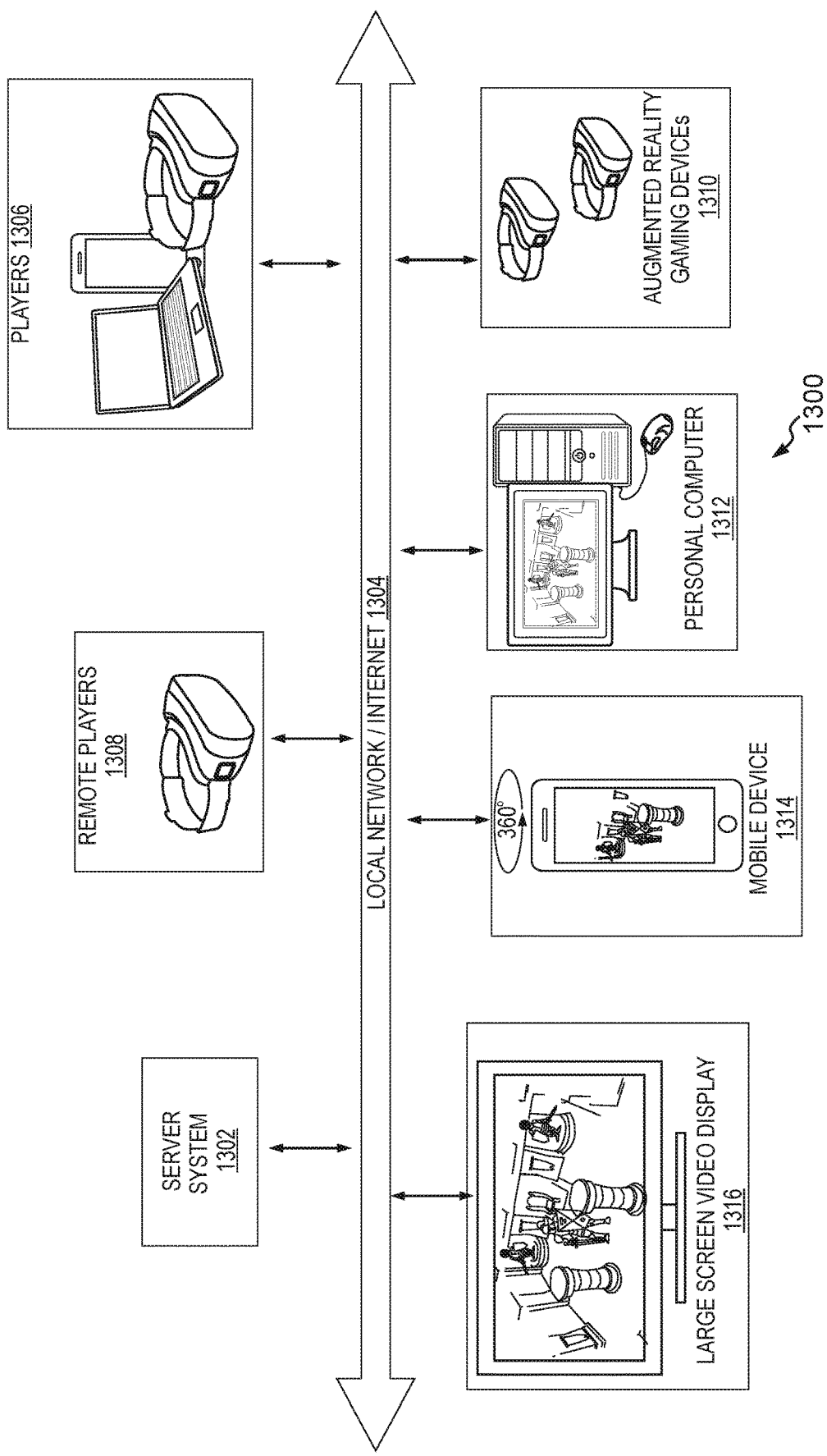
FIG. 13 is a diagram showing a network-based system linking players playing the game and potential audience viewing a live streamed game using various means in a preferred and alternate embodiment.

FIG. 13 is a diagram showing a network-based system 1300 linking players playing the game and potential audience viewing a live-streamed game using various means in preferred and alternate embodiments. The network-based system 1300 is shown to include elements of a gaming system built to play and view an AR-enhanced tabletop game. At the heart of the network-based system 1300 is server system 1302 which provides computing resources and storage to the other components. The server system 1302 could be one or more physical servers or computers, or it could be virtual computing resources located in the cloud. In an embodiment, the server system 1302 may be incorporated with the gaming device itself. The server system 1302 may include a plurality of databases such as account & bookkeeping information repository that stores key housekeeping data required to manage the function and resources of the server system, as well as the gaming and live streaming environments. For example, user profiles database is where login and authentication data for access to the gaming and live streaming environments are stored and managed. An object library (OL) may also be stored in the server system 1302, where the data relating to the virtual three-dimensional objects and characters are stored and managed. Further, a field of play database (FPDB) may be stored in the server system 1302, where data describing the composition of fields of play are stored and managed. A game repository (GR) may be stored, where data relating to all games being played are stored and managed.

All the gaming and live streaming elements are connected via a data network 1304 which could be a local network, wide-area network, or internet. The data network allows all the elements to communicate with each other. The participating players can play the game from one central location 1307 or from geographically dispersed locations 1308. The players can play the AR-enhanced tabletop games using a variety of gaming devices that can satisfy the technical requirements of the games being played. To create a new field of play, AR headset, or smart glasses with hand gesture detection capability are preferred in order to simplify the UI interaction.

Proceeding of games can be viewed by the players using the gaming device, and/or live streamed or replayed to an audience using a variety of devices. The viewing devices may include gaming devices 1310, personal computers 1312, mobile devices 1314, and large screen video displays 1316 including televisions or jumbotrons found in a stadium or e-sport venue (the "Viewing Device"). Depending on the video capability of the Viewing Device, the viewer might be able to view the image in two-dimensions or three-dimensions. For viewing using a personal computer 1312, it is possible for the viewer to move the pointing device (e.g., mouse) to capture a 360° view of the gaming environment. A similar 360° view can also be obtained by panning mobile device 1314.

Various embodiments of the present disclosure offer multiple advantages and technical effects. For instance, the principal object of the embodiments herein is to provide a computer-implemented method that delivers enhanced augmented reality gameplay experience for existing tabletop games including, but not limited to, TRPG and TMG. The embodiments herein allow multi-player tabletop games to be played by a plurality of players seated around a physical tabletop at a common location, or a plurality of remote players situated in dispersed locations, or as live stream program while preserving the traditional gameplay rules and experience of tabletop games. The embodiments also provide enhanced gameplay experience using existing physical tabletop games and commercially available AR headsets as gaming devices to deliver an enhanced mixed reality experience. The mixed reality may include both virtual and physical gameplay experience and generate content that can be live-streamed on e-sports or other channels. Further, in some embodiments, the AR headsets or other gaming devices may be used to display tabletop games-related entertainment, tutorial, and/or digital advertising content based on the identity, preference, demographics, or other characteristics of the players. In an additional embodiment, the advertising content for a particular player may be determined using machine learning analysis techniques, wherein various machine learning modules may be trained based on the previous preferences, demographics, and characteristics of the players.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Accordingly, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer-readable media as computer program products. Any form of computer-readable medium can be used in this context, such as magnetic or optical storage media. Additionally, software portions of the present invention can be instantiated (for example as object code or executable images) within the memory of any programmable computing device.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A computer-implemented method, comprising:
   receiving, by a processing system, a three-dimensional perimeter along a physical gameplay surface, from an augmented reality enabled gaming device, wherein the three-dimensional perimeter comprises an origin and an outer extension of a field of play along three dimensions defined by a player;
   determining, by the processing system, a Euclidean space, based at least, on the three-dimensional perimeter;
   calculating, by the processing system, a total volume of the Euclidean space, based at least, on the origin and the outer extension of the field of play along the three dimensions defined by the player;
   generating, by the processing system, a virtual three-dimensional grid, by dividing the total volume of the Euclidean space into a number of cuboids;
   facilitating, by the processing system, rendering of the virtual three-dimensional grid, wherein the virtual three-dimensional grid is configured to be displayed on the physical gameplay surface as viewed through the augmented reality enabled gaming device;
   receiving, by the processing system, a selection of a plurality of virtual three dimensional objects, from the augmented reality enabled gaming device; and
   fusing, by the processing system, the plurality of virtual three-dimensional objects using a pre-defined set of rules to obtain a holistic field of play.

2. The computer-implemented method as claimed in claim 1, further comprising: rendering, the holistic field of play, to the augmented reality enabled gaming device, to make the holistic field of play available to be displayed on the physical gameplay surface.

3. The computer-implemented method as claimed in claim 1, further comprising facilitating, by the processing system, the player to drag and drop the plurality of virtual three-dimensional objects on to the virtual three-dimensional grid, using the augmented reality enabled gaming device.

4. The computer-implemented method as claimed in claim 1, further comprising: assigning, a unique identifier to the holistic field of play; and
   storing the holistic field of play against the unique identifier in a game repository.

5. The computer-implemented method as claimed in claim 1, wherein a client-side application is downloaded onto the augmented reality enabled gaming device, via the processing system.

6. The computer-implemented method as claimed in claim 5, wherein the client-side application is one of a tabletop role-playing game and a tabletop miniature game.

7. The computer-implemented method as claimed in claim 1, further comprising:
   downloading, by the augmented reality enabled gaming device, a client-side application, via the processing system; and
   providing, by the augmented reality enabled gaming device, a user interface to the player to select the origin and the outer extension of the field of play along the three dimensions.

8. The computer-implemented method as claimed in claim 7, wherein the augmented reality enabled gaming device further comprises performing:
   displaying, a plurality of virtual three-dimensional objects stored in an object library, to the user via another user interface; and
   facilitating, the user to drag and drop the plurality of virtual three-dimensional objects to be populated in the virtual three-dimensional grid, via another user interface.

9. The computer-implemented method as claimed in claim 1, wherein the augmented reality enabled gaming device comprises a mixed reality viewing device and a hand movement tracker.

10. The computer-implemented method as claimed in claim 1, wherein one of the number of cuboids is selected and separated by the player to allocate a virtual three-dimensional object to the cuboid, using the augmented reality enabled gaming device.

11. The computer-implemented method as claimed in claim 1, further comprising:
    live streaming, by the processing system, an episode of a game played on the field of play for viewing by on-site or remote spectators; and
    re-rendering, by the processing system, the episode of the game played on the field of play onto one of a gaming device, a personal computer, a mobile device, and a video display.

12. A processing system, comprising:
    a memory comprising executable instructions; and
    a processor configured to execute the executable instructions to cause the processing system, at least in part, to:
       receive a three-dimensional perimeter along a physical gameplay surface, from an augmented reality enabled gaming device, wherein the three-dimensional perimeter comprises an origin and an outer extension of a field of play along three dimensions defined by a player;
       determine a Euclidean space, based at least, on the three-dimensional perimeter; calculate a total volume of the Euclidean space, based at least, on the origin and
       the outer extension of the field of play along the three dimensions defined by the player; divide the total volume of the Euclidean space into a number of cuboids; generate a virtual three-dimensional grid, based at least, on the number of cuboids;
       facilitate, rendering of the virtual three-dimensional grid, wherein the virtual three-dimensional grid is configured to be displayed on the physical gameplay surface as viewed through the augmented reality enabled gaming device;
       receive a selection of a plurality of virtual three dimensional objects, from the augmented reality enabled gaming device; and
       fuse the plurality of virtual three-dimensional objects using a pre-defined set of rules to obtain a holistic field of play.

13. The processing system as claimed in claim 12, wherein the processing system is further caused at least in part to:
    render the holistic field of play, to the augmented reality enabled gaming device, to make the holistic field of play available to be displayed on the physical gameplay surface.

14. The processing system as claimed in claim 12, wherein the processing system is further caused to facilitate the player to drag and drop the plurality of virtual three-dimensional objects on to the virtual three-dimensional grid, using the augmented reality enabled gaming device.

15. The processing system as claimed in claim 12, wherein the processing system is further caused at least in part to:
    assign a unique identifier to the holistic field of play; and
    store the holistic field of play against the unique identifier in a game repository.

16. The processing system as claimed in claim 12, wherein a client-side application is downloaded onto the augmented reality enabled gaming device, via the processing system.

17. The processing system as claimed in claim 12, wherein the processing system is further caused at least in part to:
    facilitate analyzing player related data stored in the gaming repository and user profiles database; and
    determine digital content to be displayed on the augmented reality enabled gaming device, based at least on the analyzing step.

18. An augmented reality enabled gaming device, comprising:
    a plurality of sensors;
    a memory comprising executable instructions; and
    a processor communicably coupled to a communication interface, the processor configured to execute the executable instructions to cause the augmented reality enabled gaming device to at least:
    download a client-side application, via a processing system;
    provide a user interface to a player to select an origin and an outer extension of a field of play along three dimensions;
    display a plurality of virtual three-dimensional objects stored in an object library, to the user via another user interface; and
    provide a user interface to the player to drag and drop the plurality of virtual three-dimensional objects to be populated in a virtual three-dimensional grid, via another user interface;
    receive a three-dimensional perimeter along a physical gameplay surface, from an augmented reality enabled gaming device, wherein the three-dimensional perimeter comprises an origin and an outer extension of a field of play along three dimensions defined by the player;
    determine a Euclidean space, based at least, on the three-dimensional perimeter; calculate a total volume of the Euclidean space, based at least, on the origin and
    the outer extension of the field of play along the three dimensions defined by the player; divide the total volume of the Euclidean space into a number of cuboids; generate a virtual three-dimensional grid, based at least, on the number of cuboids;
    facilitate, rendering of the virtual three-dimensional grid, wherein the virtual three-dimensional grid is configured to be displayed on the physical gameplay surface as viewed through the augmented reality enabled gaming device;
    receive a selection of a plurality of virtual three dimensional objects, from the augmented reality enabled gaming device; and
    fuse the plurality of virtual three-dimensional objects using a pre-defined set of rules to obtain a holistic field of play.

19. The augmented reality enabled gaming device as claimed in claim 18, wherein the gaming device comprises one of an augmented or mixed reality viewing device equipped with hand movement tracker.

20. The augmented reality enabled gaming device as claimed in claim 18, wherein the gaming device is further caused to access an episode of a tabletop game played on the field of play, based at least on a game identifier.

* * * * *